United States Patent
Berg

(10) Patent No.: US 8,226,120 B2
(45) Date of Patent: Jul. 24, 2012

(54) ADJUSTABLE ERGONOMIC VEHICLES

(75) Inventor: Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 189 days.

(21) Appl. No.: 12/079,082

(22) Filed: Feb. 6, 2008

(65) Prior Publication Data

US 2008/0217088 A1   Sep. 11, 2008

Related U.S. Application Data

(60) Provisional application No. 60/900,657, filed on Feb. 9, 2007.

(51) Int. Cl.
*B62D 1/18* (2006.01)
*B62J 25/00* (2006.01)

(52) U.S. Cl. ....... 280/775; 280/291; 180/311; 180/90.5; 180/326; 74/493; 296/75

(58) Field of Classification Search .......... 180/311, 180/312, 90.6, 273, 326, 287; 280/291, 775, 280/163; 362/464, 465, 475, 476; 74/493; 296/75; 701/54
See application file for complete search history.

(56) References Cited

U.S. PATENT DOCUMENTS

| | | |
|---|---|---|
| 195,122 A | 9/1877 | Guyer |
| 1,082,423 A | 12/1913 | Hartman |
| 2,141,093 A | 12/1938 | Richter et al. |
| 2,284,352 A | 5/1942 | Zank |
| 2,396,511 A | 3/1946 | Issigonis |
| 2,628,657 A | 2/1953 | Orrick, Jr. |
| 2,868,273 A | 1/1959 | Barrett |
| 2,984,290 A | 5/1961 | Miller |
| 3,167,298 A | 1/1965 | Senkowski et al. |
| 3,347,512 A | 10/1967 | Campbell |
| 3,736,020 A | 5/1973 | Pilachowski et al. |
| 3,747,888 A | 7/1973 | Heckett |
| 3,841,696 A | 10/1974 | Wagner |
| 3,844,610 A | 10/1974 | Adams |
| 3,913,975 A | 10/1975 | Carter |
| 3,927,854 A | 12/1975 | Carey |
| 4,059,171 A | 11/1977 | Pakosh |
| 4,062,585 A | 12/1977 | Herring, Jr. |
| 4,129,198 A | 12/1978 | Hunter |
| 4,198,092 A | 4/1980 | Federspiel |
| 4,380,352 A | 4/1983 | Diffrient |
| 4,521,053 A | 6/1985 | de Boer |
| 4,527,831 A * | 7/1985 | Katsuoka ................ 297/243 |
| 4,563,038 A | 1/1986 | Hirose |

(Continued)

FOREIGN PATENT DOCUMENTS

DE        41 36 296 A1    5/1993

(Continued)

OTHER PUBLICATIONS

American National Standards Institute, Inc., "Four Wheel All-Terrain Vehicles—Equipment, Configuration, and Performance Requirements", Approved Feb. 15, 2001, 24 pgs.

(Continued)

*Primary Examiner* — Drew Brown
(74) *Attorney, Agent, or Firm* — Faegre Baker Daniels LLP

(57) ABSTRACT

An all-terrain vehicle that permits adjustment of rider supports to ergonomically accommodate both a single rider and multiple riders.

54 Claims, 27 Drawing Sheets

U.S. PATENT DOCUMENTS

| | | | |
|---|---|---|---|
| 4,662,597 A | 5/1987 | Uecker et al. | |
| 4,688,817 A | 8/1987 | Marier | |
| 4,714,227 A | 12/1987 | Holm et al. | |
| 4,779,695 A | 10/1988 | Yasui | |
| 5,007,675 A | 4/1991 | Musto et al. | |
| 5,037,155 A | 8/1991 | Holm et al. | |
| 5,149,034 A | 9/1992 | Ganaja | |
| 5,207,289 A | 5/1993 | Wilmo | |
| 5,309,861 A | 5/1994 | Mardikian | |
| 5,324,095 A | 6/1994 | Yamauchi | |
| 5,367,978 A | 11/1994 | Mardikian | |
| 5,458,213 A | 10/1995 | Nakaya et al. | |
| 5,509,496 A * | 4/1996 | Erickson et al. | 180/307 |
| 5,613,570 A | 3/1997 | Becker | |
| 5,618,021 A | 4/1997 | Brodersen | |
| 5,713,629 A | 2/1998 | Plackis | |
| 5,876,085 A | 3/1999 | Hill | |
| 6,007,150 A | 12/1999 | Clerkin et al. | |
| 6,102,466 A * | 8/2000 | Kanazawa et al. | 296/75 |
| 6,182,590 B1 | 2/2001 | Patera | |
| 6,270,106 B1 * | 8/2001 | Maki et al. | 280/291 |
| 6,276,291 B1 | 8/2001 | Lapointe et al. | |
| 6,276,653 B1 | 8/2001 | Traxler | |
| 6,354,556 B1 | 3/2002 | Ritchie et al. | |
| 6,460,818 B1 | 10/2002 | Garelick et al. | |
| 6,502,863 B1 * | 1/2003 | Takahashi et al. | 280/847 |
| 6,578,562 B1 | 6/2003 | Aljabari et al. | |
| 6,732,830 B2 | 5/2004 | Gagnon et al. | |
| 6,755,269 B1 * | 6/2004 | Davis et al. | 180/89.1 |
| 6,773,049 B2 | 8/2004 | Rupiper et al. | |
| 6,880,483 B2 | 4/2005 | Fedders | |
| 6,968,917 B2 | 11/2005 | Rondeau et al. | |
| 6,971,714 B1 | 12/2005 | Hanagan | |
| 7,008,015 B2 | 3/2006 | Bischoff | |
| 7,055,454 B1 | 6/2006 | Whiting et al. | |
| 7,121,371 B2 | 10/2006 | Rondeau et al. | |
| 7,143,860 B2 * | 12/2006 | Marks et al. | 180/332 |
| 7,258,192 B2 | 8/2007 | Davis et al. | |
| 7,331,418 B2 * | 2/2008 | Audet | 180/312 |
| 7,404,568 B1 * | 7/2008 | Portelance et al. | 280/291 |
| 7,506,714 B2 * | 3/2009 | Davis et al. | 180/89.1 |
| 7,543,836 B2 * | 6/2009 | Portelance et al. | 280/291 |
| 7,559,576 B1 * | 7/2009 | Honkala et al. | 280/775 |
| 2002/0011745 A1 | 1/2002 | Petersen | |
| 2004/0016316 A1 | 1/2004 | Bechler | |
| 2004/0026150 A1 * | 2/2004 | Nishi et al. | 180/272 |
| 2004/0029459 A1 | 2/2004 | Berthiaume et al. | |
| 2004/0031640 A1 | 2/2004 | Tweet | |
| 2004/0035625 A1 | 2/2004 | Talbot et al. | |
| 2004/0035626 A1 | 2/2004 | Girouard et al. | |
| 2004/0129483 A1 * | 7/2004 | Girouard et al. | 180/311 |
| 2004/0173653 A1 | 9/2004 | Audet | |
| 2004/0206568 A1 | 10/2004 | Davis et al. | |
| 2005/0115754 A1 | 6/2005 | Watson et al. | |
| 2005/0121953 A1 | 6/2005 | Sprouse, II | |
| 2005/0168018 A1 | 8/2005 | Cox | |
| 2005/0194199 A1 | 9/2005 | Marks et al. | |
| 2005/0247156 A1 * | 11/2005 | Vaisanen | 74/493 |
| 2005/0247506 A1 * | 11/2005 | Rondeau et al. | 180/312 |
| 2005/0275268 A1 | 12/2005 | Oomori | |
| 2006/0066122 A1 | 3/2006 | Wiseman | |
| 2006/0113139 A1 * | 6/2006 | Nishi et al. | 180/273 |
| 2007/0034435 A1 | 2/2007 | Berg et al. | |
| 2007/0262604 A1 | 11/2007 | Takei et al. | |
| 2007/0278026 A1 * | 12/2007 | Davis et al. | 180/90.6 |
| 2008/0029990 A1 * | 2/2008 | Danze | 280/163 |
| 2008/0030040 A1 * | 2/2008 | Danze | 296/75 |
| 2008/0143137 A1 * | 6/2008 | Bowen | 296/75 |
| 2008/0217088 A1 | 9/2008 | Berg | |
| 2008/0246300 A1 * | 10/2008 | Portelance et al. | 296/75 |
| 2009/0108560 A1 * | 4/2009 | Mountz et al. | 280/291 |
| 2009/0195035 A1 | 8/2009 | Ripley | |
| 2009/0236820 A1 * | 9/2009 | Chang et al. | 280/283 |
| 2010/0019524 A1 | 1/2010 | Utke et al. | |
| 2010/0084212 A1 * | 4/2010 | Smith et al. | 180/311 |

FOREIGN PATENT DOCUMENTS

| | | |
|---|---|---|
| DE | 19531985 A1 | 3/1997 |
| DE | 203 04 086 U1 | 5/2003 |
| DE | 10 2005 013610 A1 | 9/2006 |
| EP | 1296036 A2 | 3/2003 |
| EP | 1 645 487 A2 | 4/2006 |
| GB | 159 650 A | 3/1921 |
| GB | 1501631 A | 2/1978 |
| JP | 2293258 | 12/1990 |
| JP | 06105727 A | 4/1994 |
| JP | 2004067079 | 3/2004 |
| JP | 2006044395 | 2/2006 |
| WO | WO 03/053769 | 7/2003 |
| WO | WO 03/053769 A1 | 7/2003 |
| WO | WO 2006/110687 A2 | 10/2006 |
| WO | WO 2008/100398 A | 8/2008 |

OTHER PUBLICATIONS

American National Standards Institute, Inc., "Draft American National Standards for Four Wheel Two Person All-Terrain Vehicles—Equipment, Configuration, and Performance Requirements", Draft Jan. 19, 2004, 39 pgs.

U.S. Appl. No. 10/903,464, filed on Jul. 30, 2004 (unpublished).

Search Report and Written Opinion for corresponding PCT/US2008/001535 issued by the European Patent Office on Sep. 3, 2008.

[Online] XP002481531, Retrieved from the Internet: URL:http://web.archive.org/web/20061015120730/http://www.maxatvs.com/index.php?submenu==Products&src=gendocs&link=MaxII> [retrieved on Oct. 15, 2006] the whole document.

* cited by examiner

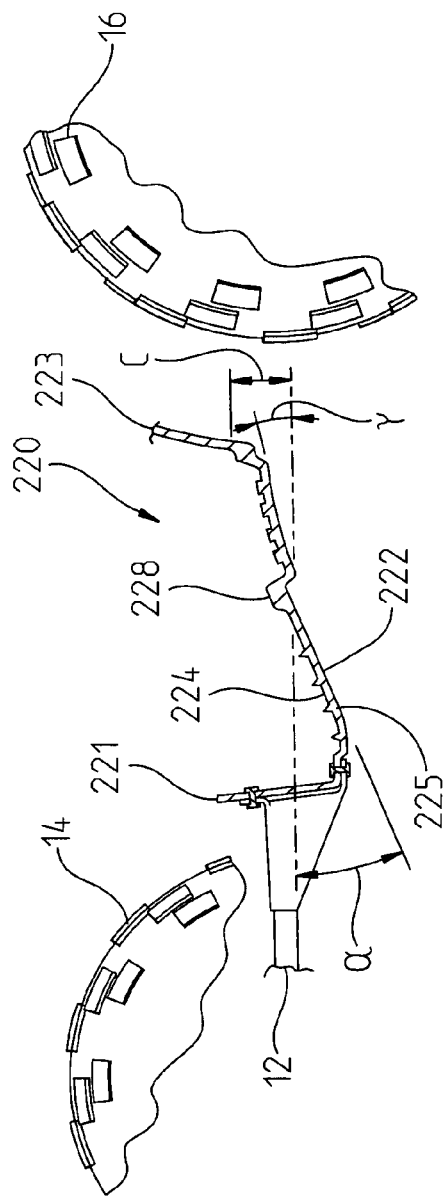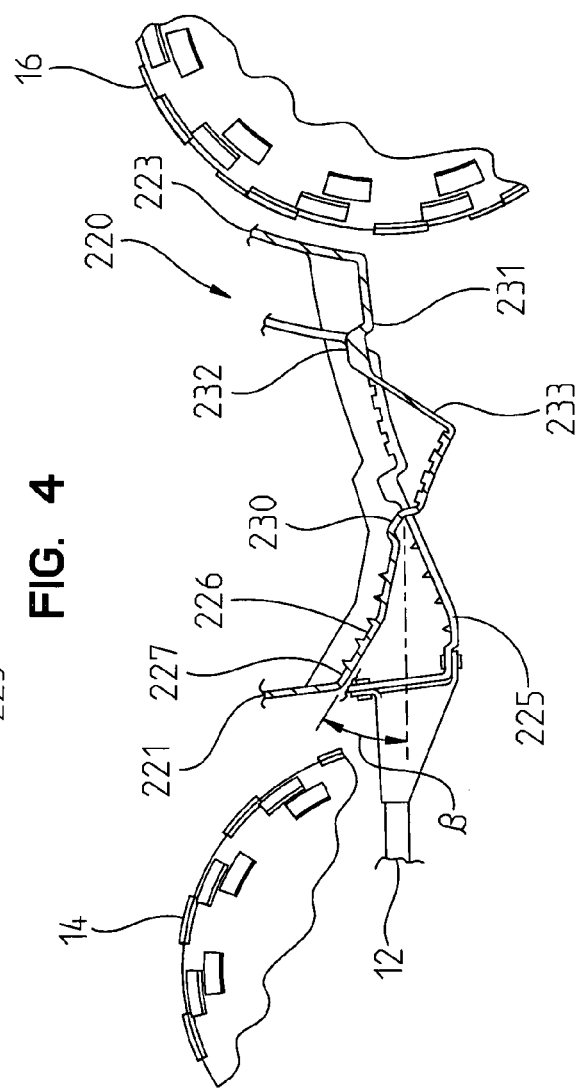

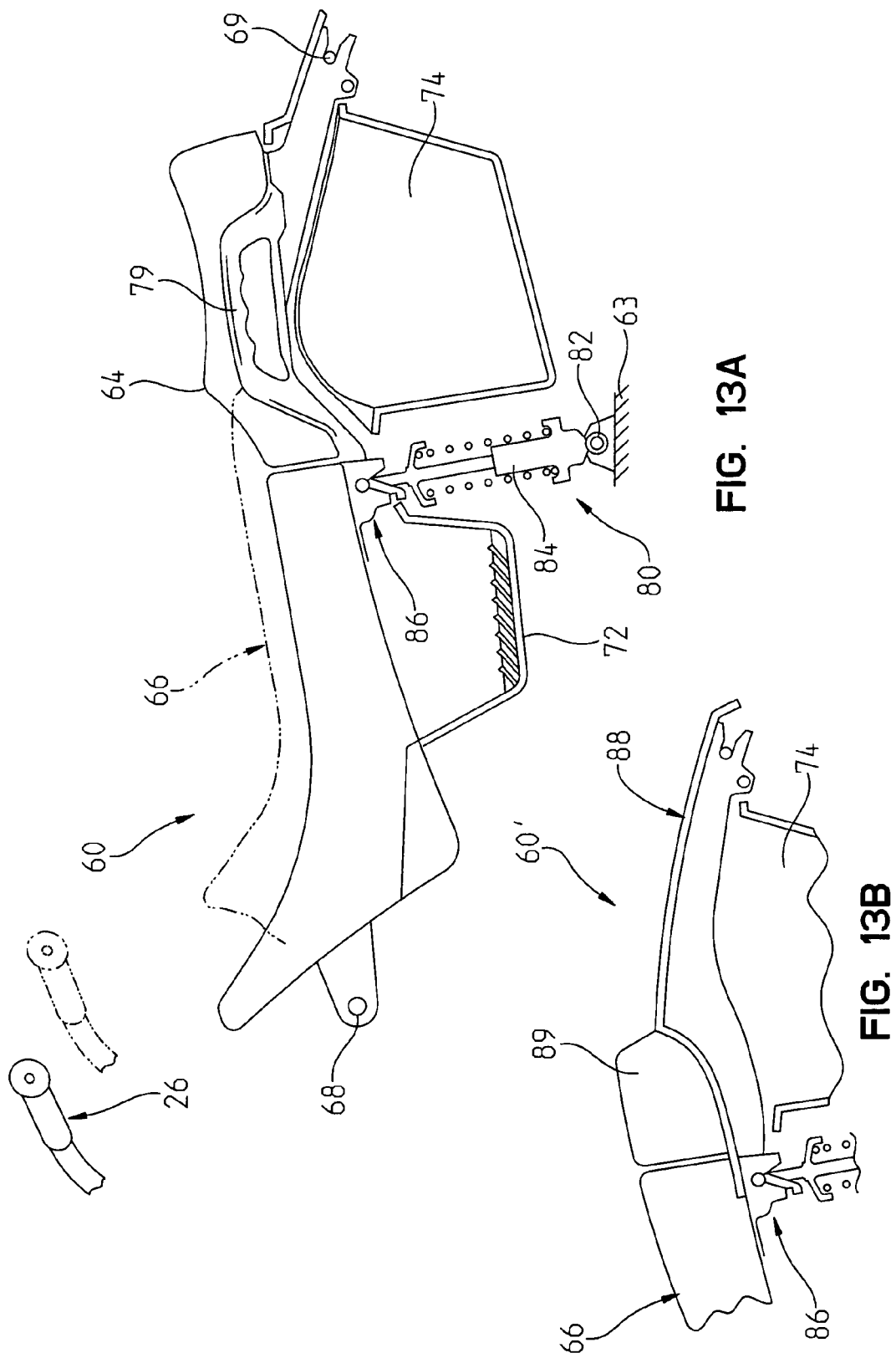

ADJUSTABLE ERGONOMIC VEHICLES

CROSS-REFERENCE TO RELATED APPLICATIONS

This application claims priority to U.S. Provisional Patent Application Ser. No. 60/900,657, filed on Feb. 9, 2007, the disclosure of which is expressly incorporated herein by reference. The present application is further related to U.S. patent application Ser. No. 11/250,283, filed on Oct. 14, 2005, and U.S. patent application Ser. No. 10/903,464, filed on Jul. 30, 2004, and incorporates herein by reference the entirety of said applications.

FIELD OF THE INVENTION

The present disclosure relates to adjustable ergonomic vehicles configured to accommodate multiple riders, and more particularly, to a vehicle such as an all-terrain vehicle (ATV) that permits adjustment of its handlebar position, seat position, and/or its footrest position to ergonomically accommodate multiple riders of different sizes and/or different riding styles.

BACKGROUND AND SUMMARY OF THE INVENTION

Ergonomics are important for recreational and utility vehicles, such as snowmobiles, ATVs, utility vehicles, and personal watercraft (PWCs). Often, a single rider may wish to ride in a variety of styles. Further, a single vehicle may be operated by several different riders over the course of its useful life. These riders are frequently of different heights and sizes. For example, a single vehicle may be operated by both a generally smaller female adolescent and a generally larger male adult.

Additionally, it may be desired to use the vehicle to transport a driver and a passenger in an in-line arrangement (i.e., longitudinally spaced). From an ergonomic standpoint, the position of steering members, such as the handlebars and the steering post, the height of the seat, and the position of the footrests relative to the driver and/or passenger are important. Handlebars that are too close or too distant, or at an inappropriate height, a seat that is too low, or footrests that are too far from the seat may provide an inadequate fit for a driver and/or passenger or may render the vehicle unsuitable for a particular riding style.

Growing popularity of ATVs has lead to a demand for more two passenger or "2-up" ATVs having in-line seating that can safely and comfortably carry two riders. As detailed below, current "2-up" ATVs typically utilize a longer wheelbase than single rider ATVs. It is desired to prevent ATVs from tipping over either frontward or backward during longitudinal ascent of a grade or longitudinal descent down a grade. General stability guidelines have been provided for ATVs that suggest that an ATV and its passenger or passengers should be able to remain stable, i.e. not tip over.

Existing ATV stability guidelines are provided in ANSI/SVIA-1-2001 (Approved Feb. 15, 2001) entitled "Four Wheel All-Terrain Vehicles—Equipment, Configuration, and Performance Requirements", the disclosure of which is expressly incorporated by reference herein. Proposed stability guidelines for 2-up ATVs are provided in ANSI/12AMA X-XXXX (Draft Jan. 19, 2004), entitled "Draft American National Standards for Four Wheel Two Person All-Terrain Vehicles—Equipment, Configuration, and Performance Requirements", the disclosure of which is expressly incorporated by reference herein. The proposed 2-up ATV stability guidelines indicate that longitudinal stability requires that the 2-up ATV reach a minimum angle of 36 degrees about a tilt axis perpendicular to the ATV longitudinal axis, with either end of the ATV positioned downhill, before tire lift-off occurs. The proposed 2-up ATV guidelines further provide that lateral stability requires that the 2-up ATV reach a minimum angle of 25 degrees with either side positioned downhill, before tire lift-off occurs. Most ATVs designed to carry a single passenger do not meet the aforementioned stability guidelines when a second passenger is seated behind the driver due to a shift in the center of gravity of the combined vehicle and riders. Most current ATVs designed to carry two riders have a longer wheelbase than a corresponding single rider ATV to satisfy the aforementioned stability guidelines. The added length allows the ATV to comply with the stability requirement when a passenger is present, however it may add weight and be more difficult to maneuver, particularly in limited space.

According to an illustrative embodiment of the present disclosure, an all-terrain vehicle capable of transporting a driver and a passenger includes a frame, a pair of front wheels operably coupled to the frame, a pair of rear wheels operably coupled to the frame, and a wheelbase being defined between the front wheels and the rear wheels. A straddle type seat is supported by the frame and includes multiple longitudinally spaced apart rider seating positions, wherein the wheelbase is less than 52 inches.

According to another illustrative embodiment of the present disclosure, an all-terrain vehicle capable of transporting a driver and a passenger includes a frame having longitudinally spaced-apart ends defining a longitudinal axis of the vehicle, a plurality of wheels operatively coupled to the frame, an engine supported by the frame, a straddle type seat supported by the frame, and a handlebar assembly moveable between a first position and a second position along the longitudinal axis. The first position of the handlebar assembly defines only a first driver seating position on the seat. The second position of the handlebar assembly defines a second driver seating position and a passenger seating position on the seat.

According to a further illustrative embodiment of the present disclosure, an all-terrain vehicle includes a frame including longitudinally spaced-apart ends defining a longitudinal axis of the vehicle, a plurality of wheels operably coupled to the frame, an engine supported by the frame, and a straddle type seat supported by the frame. A footrest is supported laterally from the seat and includes a forward wall. A steering column is movable along the longitudinal axis of the vehicle from at least between a first position approximately 3 inches behind the forward wall to a second position approximately 1 inch in front of the front wall.

According to another illustrative embodiment of the present disclosure, an all-terrain vehicle includes a frame having longitudinally spaced-apart ends defining a longitudinal axis of the vehicle, a pair of front wheels operably coupled to the frame, and a pair of rear wheels operably coupled to the frame. A straddle type seat is supported by the frame, and a footrest is supported laterally from the seat. The footrest includes a forward inner portion with a downwardly angled toe section, and a forward outer portion with an upwardly angled toe section.

According to a further illustrative embodiment of the present disclosure, an all-terrain vehicle capable of transporting a driver and a passenger includes a frame, a plurality of wheels operatively coupled to the frame, an engine supported by the frame, a straddle type seat supported by the frame, a footrest supported laterally from the seat and having a platform, a passenger foot support, and a coupler removably coupling the passenger foot support to the platform.

According to another illustrative embodiment of the present disclosure, a vehicle includes a frame, a straddle-type seat mounted to the frame for a driver, a passenger seat surface positioned rearward of the driver, and a footrest positioned along the side of the vehicle and longitudinally disposed and profiled for the feet of the driver and the passenger.

The footrest includes a removable pedestal riser positioned for the passenger for raising the height of the passenger foot area.

According to yet another illustrative embodiment of the present disclosure, an all-terrain vehicle includes a frame, a plurality of wheels operably coupled to the frame, an engine supported by the frame, a seat supported by the frame, and a footrest supported laterally from the seat and having a platform. The platform defines a driver foot position and a rider foot position, wherein the footrest has a length of less than approximately 17 inches.

According to a further illustrative embodiment of the present disclosure, an all-terrain vehicle includes a frame defining a longitudinal axis, a plurality of wheels operably coupled to the frame, a drivetrain supported by the frame, and a controller operably coupled to the drivetrain. A seat and a movable backrest are supported by the frame. A backrest sensor is in communication with the controller and is configured to detect the position of the backrest relative to at least one of the seat and the frame. The controller controls operation of the drivetrain in response to input from the backrest sensor.

According to a further illustrative embodiment of the present disclosure, an all-terrain vehicle capable of transporting a driver and a passenger includes a frame having longitudinally spaced-apart ends defining a longitudinal axis of the vehicle, a plurality of wheels operatively coupled to the frame, an engine supported by the frame, a rear seat supported by the frame, and a front seat supported longitudinally in front of the rear seat. The front seat is configured to pivot relative to the frame for providing a lower level step through for a passenger.

According to another illustrative embodiment of the present disclosure, an all-terrain vehicle capable of transporting a driver and a passenger includes a frame having longitudinally spaced-apart ends defining a first longitudinal axis of the vehicle, a plurality of wheels operatively coupled to the frame, an engine supported by the frame, a rear seat supported by the frame, a front seat supported by the frame, and a suspension system coupled between the rear seat and the front seat and configured to permit the front seat and the rear seat to pivot relative to each other to lessen the effects of rough or uneven terrain.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 4 is a cross-sectional view of the footrest of FIG. 3 taken along line 4-4;

FIG. 5 is a cross-sectional view of the footrest of FIG. 3 taken along line 5-5;

FIG. 13A is a partial side view of an illustrative embodiment body for an ATV having an adjustable seat suspension;

FIG. 13B is a partial side view of an alternative embodiment rear portion of the ATV shown in FIG. 13A;

Figure 1:
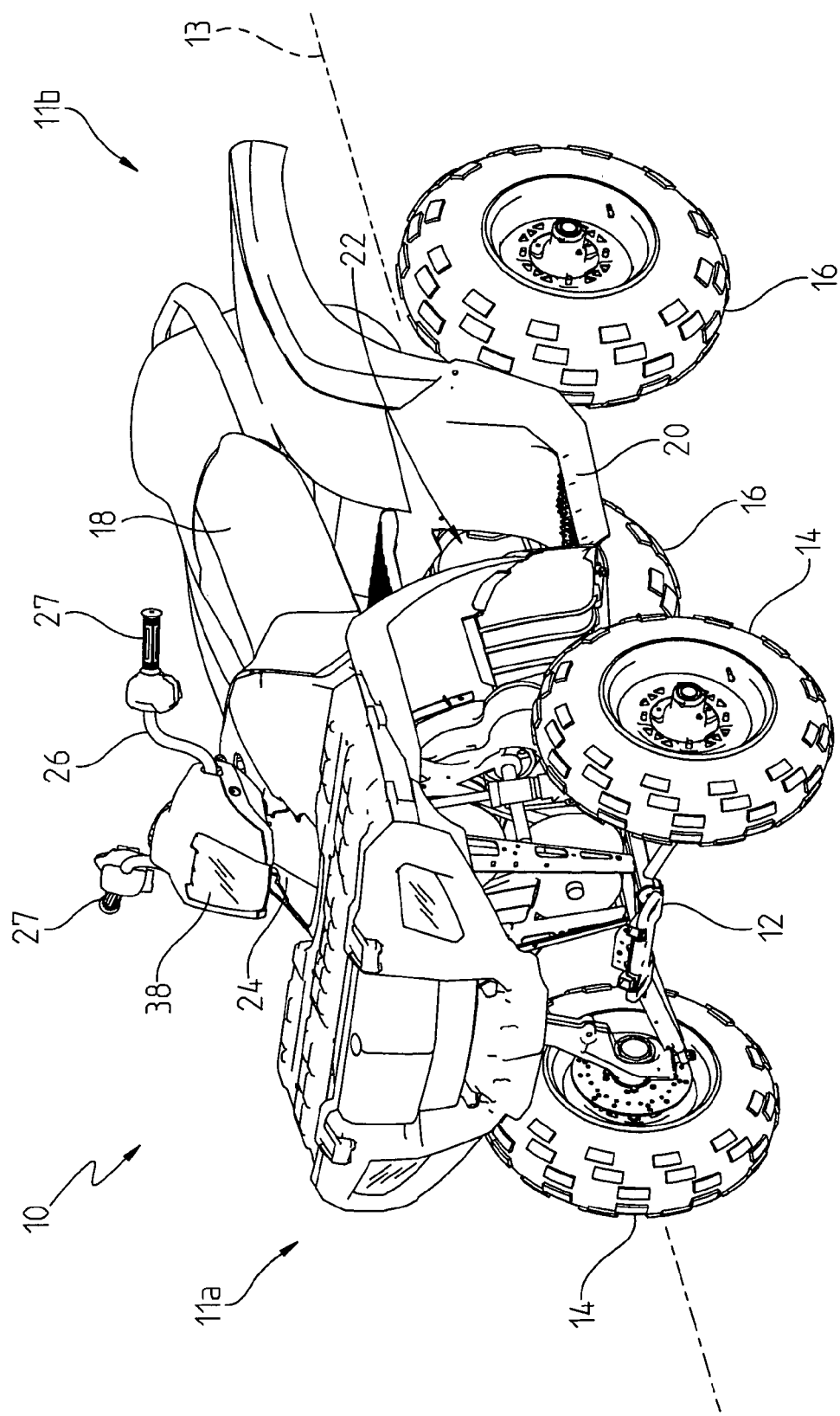
FIG. 1 is a perspective view of an ATV in accordance with certain illustrative embodiments of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an ATV, certain features described herein may be applied to other applications such as utility vehicles (UVs), snowmobiles, motorcycles, mopeds, etc.

The following detailed description should be read with reference to the drawings, in which like elements in different drawings are numbered identically. The drawings, which are not necessarily drawn to scale, depict selected embodiments and are not intended to limit the scope of the embodiments. Several forms of the embodiments will be shown and described, and other forms will be apparent to those skilled in the art. It will be understood that embodiments shown in drawings and described are merely for illustrative purposes and are not intended to limit the scope of the embodiments as defined in any claims that follow.

Recreational and performance straddle-seat vehicles, such as snowmobiles, personal watercrafts (PWCs), and all-terrain vehicles (ATVs), can provide an enjoyable expedience for riders and passengers of such vehicles. "Riders" of these types of vehicles, as used herein, include the primary operators or drivers of such vehicles, as well as the passengers of such vehicles. The experience and safety of such vehicles can be enhanced by design features that improve the ergonomics of the vehicle. Ergonomic design choices affect the comfort and fatigue level of the rider, and/or passengers, as well as the rider's ability to optimally control and maneuver the vehicle in a variety of riding conditions. Three illustrative components of such vehicles that may affect ergonomic design are the handlebars, seat, and footrests. An individual rider, for example, may have a preferred spatial arrangement of these three components that accounts for that person's physical characteristics and other personal preferences. Riders of these types of vehicles typically experience three generally different operating modes, loosely corresponding either to a "racing/sport/rough-water/snow-cross" mode, to a "touring/leisure/cruising" mode, or to a "2-up" seating mode to accommodate at least one passenger in-line with the driver. The terms "sport," "touring," and "2-up" will be used herein to distinguish between the three generally different operating modes of these types of vehicles.

The one-up "sport" mode of operation typically refers to use of such vehicles where the terrain is rapidly changing and/or where the speed of the vehicle requires the operator to be in a heightened state of responsiveness. This mode typically involves repositioning the operator higher and more forward to obtain greater control of the vehicle and to improve forward visibility. The one-up "touring" mode of operation typically refers to use of such vehicles where the terrain is relatively smooth and unchanging and/or, where the vehicle speed is such that the operator is more concerned with the comfort of the rider(s) and less concerned with the immediate threat of collision or loss of control of the vehicle. This mode typically involves repositioning the operator lower, and more rearward to provide greater comfort and less fatigue to the rider(s) of the vehicle. The "2-up" mode of operation typically refers to use of the vehicle when both a driver and passenger are supported in an in-line or a longitudinally spaced relation. This mode typically involves repositioning the driver more forward to allow room for the passenger behind the driver and to maintain stability.

Although the three generally different operating modes are described as distinctly different modes, the adjustments (described in further detail below) used to accomplish each mode may be made either along a continuous adjustment path, or at a number of discrete intervals along an adjustment path. This may enable the operator to "customize" the adjustment between the three operating modes according to individual preference, and allow for varying degrees of adjustment between the three operating modes. For simplicity, the remaining discussion will assume that there are only three generally different operating modes and that the adjustment is essentially for three mode operation. However, the invention is not so limited and encompasses the full range of possible adjustments between the "sport," "touring," and "2-up," and possibly additional, operating modes.

An "angular" adjustment of the handlebars, seat, and/or footrests refers to an adjustment wherein a given component moves a certain angle of rotation about an essentially stationary pivot point or axis, and may also include vertical and/or horizontal (i.e., translational) movement. Angular adjustments may be one way to ergonomically adjust for the three generally different operating modes. For example, an ATV rider encountering steep and/or bumpy terrain may prefer to ride in a position where the rider's center of gravity is repositioned farther forward and higher than it would be if ergonomically adjusted for touring on flat, smooth pavement, while also positioning the rider's body to be angled downward. This may be accomplished by pivotally adjusting the seat and/or handlebars about an axis that extends horizontally in a direction transverse to the longitudinal axis of the vehicle chassis. Although such an axis for adjustment may be physically present on the vehicle, as may be the case with a rotatable mount attached to the vehicle chassis, an angular adjustment may also be accomplished with equivalent means, such as with a pair of slidable arcuate supports, for example, which may provide a combination of vertical, horizontal, and angular adjustments.

An "ergonomically correct" arrangement refers to a spatial arrangement of the handlebars, seat, and/or footrests in a vehicle where the relative position of these three components is comfortable for a given rider, An "ergonomically stable" condition refers to the ability of a vehicle to maintain a given ergonomic spatial arrangement while shifting from one operating mode to another.

The present invention is best understood with reference to the accompanying drawing figures. An all-terrain vehicle or ATV 10 in accordance with certain illustrative embodiments of the present disclosure is shown in FIG. 1. ATV 10 includes a chassis or frame 12, two front wheels 14, two rear wheels 16, a straddle-type seat 18, laterally extending footrests 20 on opposite sides of the vehicle 10, a headlight 38, and an engine 22 located generally beneath the straddle-type seat 18 and substantially between the footrests 20. A steering post 24 is operatively connected to the pair of wheels 14. A handlebar assembly 26 is supported by the steering post 24 may be provided for rotating the steering post 24 about its longitudinal axis to effect steering of the front wheels 14. The frame 12 includes longitudinal axis spaced-apart front and rear ends 11a and 11b defining a longitudinal axis 13 of the ATV 10.

Figure 2:
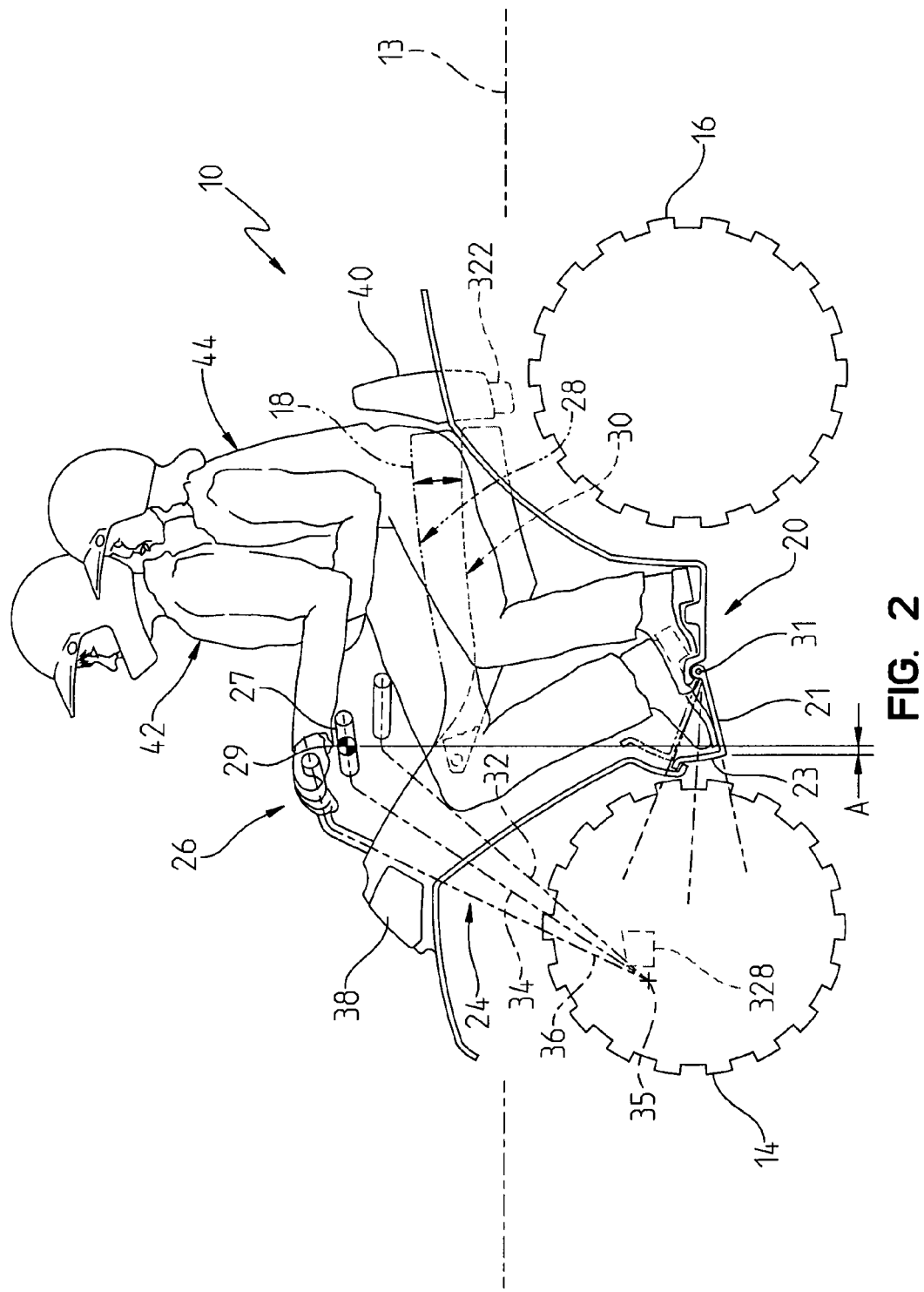
FIG. 2 is a diagrammatic side view of an illustrative embodiment ATV.

FIG. 2 is a diagrammatic side view of an illustrative embodiment of ATV 10. ATV 10 illustrated in FIGS. 1 and 2 allows for angular, adjustment of the handlebar assembly 26 along a longitudinal or north-south direction of ATV 10 (i.e., generally parallel to longitudinal axis 13), thereby enabling movement of the handlebar assembly 26 from a relatively central position 34 in the sport mode to either a forward position 36 for the 2-up mode or a rearward position 32 for the touring mode. More particularly, in either the central position 34 or the rearward position 32, defining the sport mode or the touring mode, respectively, the handlebar assembly 26 defines only a first driver seating position on the seat 18 (i.e. no defined passenger seating position). However, in the forward position 36, the handlebar assembly 26 defines a second driver seating position and a passenger seating position on the seat 18 (i.e. the 2-up mode). The second driver seating position is longitudinally spaced in front of the first driver seating position and the passenger seating position.

The ATV 10 further allows angular adjustment of seat 18 from a lower touring mode position 30 to an upwardly angled sport mode position 28, and vice versa. In one illustrative embodiment, seat 18 may be adjusted downwardly between approximately 2 to 4 inches when operated in the 2-up mode. The lowered seat 18 is configured to provide improved vehicle stability and to allow a generally smaller passenger 44 more easily reach the footrests 20. ATV 10 may also include an adjustable rear seat portion or backrest 40 to accommodate passenger 44 positioned behind the driver in the 2-up mode. As such, the passenger seating position defined when the handlebar assembly 26 is in the 2-up mode may be on seat 18 or on seat portion 40.

FIG. 2 further illustrates footrest 20 including adjustable foot support surface 21 that may provide an ergonomic riding position in any riding mode. More particularly, foot support surface 21 may pivot about a pivot point 31 between a toe down foot position (illustratively between 5 degrees and 15 degrees below horizontal) for the two-up riding mode of operation, and a toe up foot position (illustratively between 5 degrees and 15 degrees above horizontal) for comfort in the one-up touring mode of operation.

Figure 3:
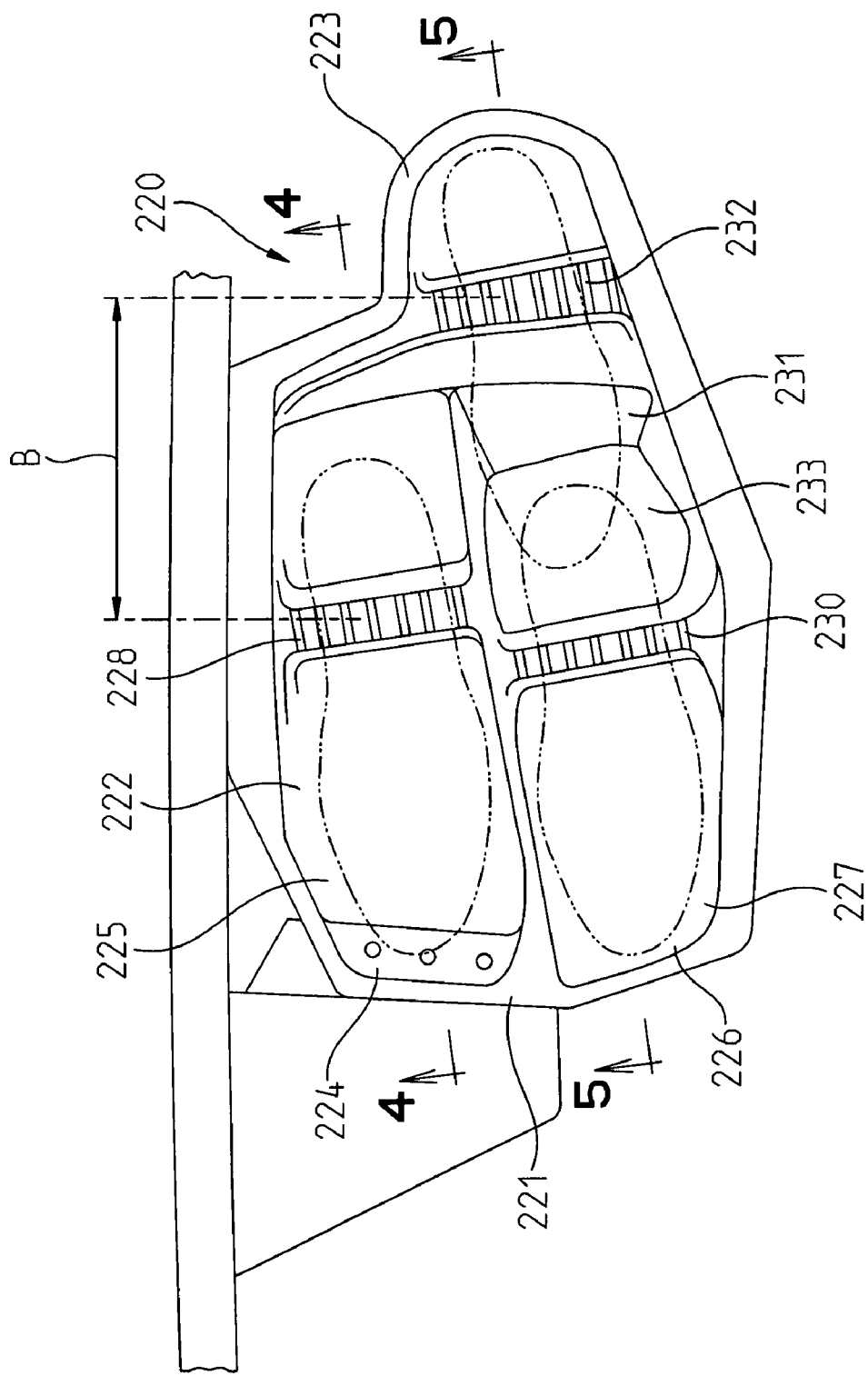
FIG. 3 is a top view of a further illustrative embodiment footrest for use with the ATV of FIG. 2.

FIGS. 3-5 show a further illustrative embodiment footrest 220 formed of a single stationary support 222, such as stamped metal, having laterally spaced forward inner and outer portions 224 and 226 positioned intermediate front and rear walls 221 and 223, respectively. The inner portion 224 includes a fixed toe-down section 225 to position a driver's foot during two-up and sport modes of operation. Illustratively, the fixed toe-down section is angled downwardly by angle α, which may be between 5° and 20° from horizontal. A driver foot peg 228 is supported by the inner portion 224. The outer portion 226 includes a fixed toe-up section 227 to position a driver's foot during the touring mode of operation. Illustratively, the fixed toe-up section is angled upwardly by angle β, which may be between 5° and 15° from horizontal. A driver foot peg 230 is supported by the outer portion 226. A rearward outer portion 231 is positioned behind the forward outer portion 226. The rearward outer portion 231 includes a fixed toe-down section 233 to position a passenger's foot during the 2-up mode of operation. Illustratively, the fixed toe-down section is angled downwardly by angle γ, which may be between 5° and 20° from horizontal. A passenger foot peg 232 is supported by rearward outer portion 231. In one illustrative embodiment, the driver foot peg 228 is longitudinally spaced from the passenger foot peg 232 by distance B, illustratively about 9 inches. The passenger foot peg 232 is illustratively elevated by distance C, approximately 2 to 4 inches, from the driver foot peg 230 to allow a smaller passenger to reach the foot support 222. Various comfortable passenger positions may be accommodated by adjusting the seat height relative to the foot support 222. It should be noted that ATV 10 may include any of the types of adjustable seats and footrests described herein.

Figure 6:
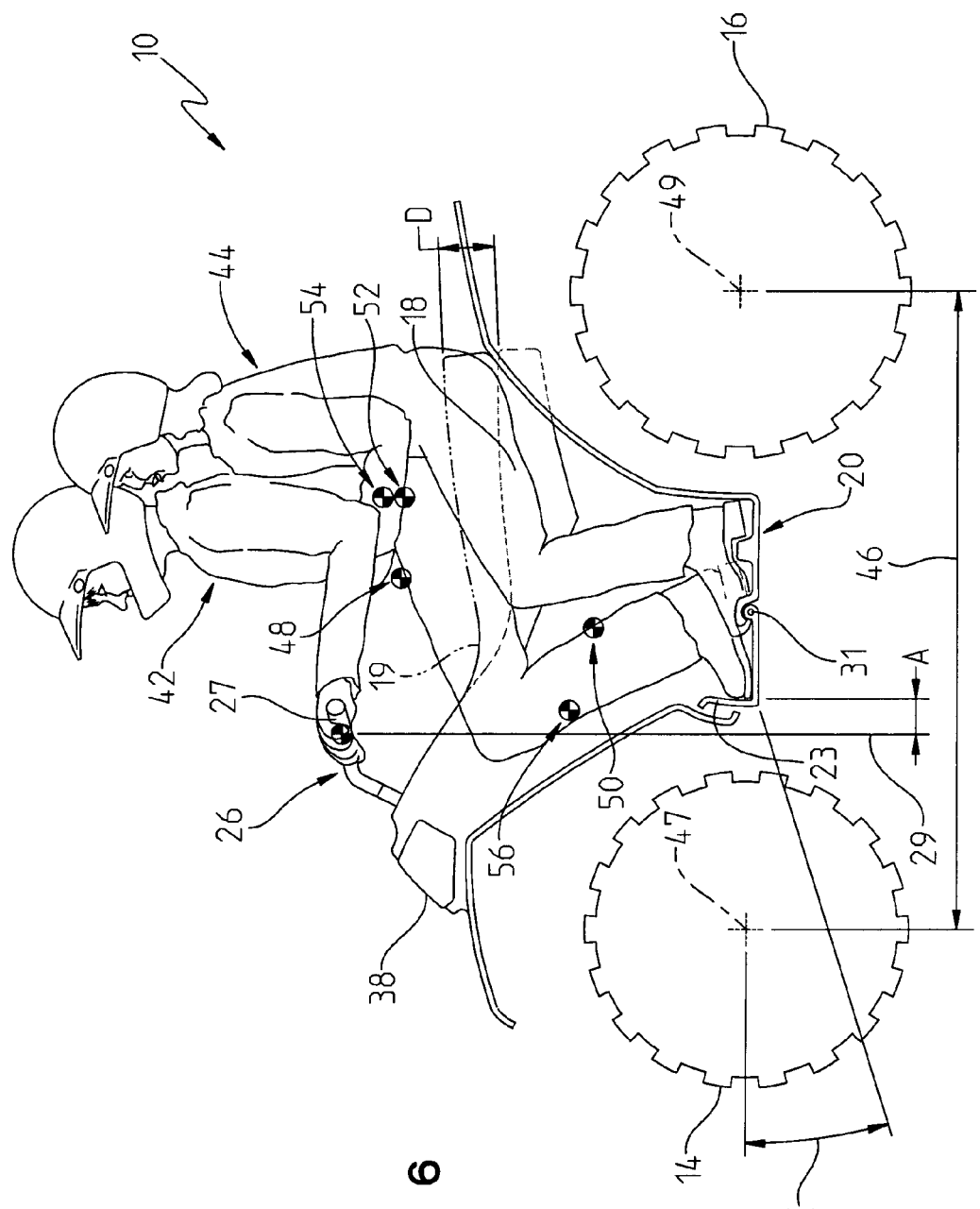
FIG. 6 is a diagrammatic right side view of an illustrative ATV with a driver and passenger supported thereon.

Illustratively, the angular adjustment of handlebar assembly 26 may be accomplished by pivoting steering post 24 about a pivot axis 35 (FIG. 2), or by adjusting the angular relationship between left and right hand grips 27 of handlebar assembly 26, which is explained in greater detail below. The three riding modes defined by handlebar assembly 26 may relate to distance A as shown in FIG. 2. Distance A is defined as the distance between axis 29 and forward wall 23 of footrest 20, as shown in FIGS. 2 and 6. Axis 29 is a vertical axis extending through the middle portion or center of hand grip 27 of handlebar assembly 26 (i.e., proximate the gripping location of the driver 42). For the embodiment shown in FIG. 2, when handlebar assembly 26 is positioned in the intermediate sport mode position 34, distance A may be within a range of approximately −5 inches (5 inches in front of forward wall 23 of footrest 20) to 7 inches (7 inches behind forward wall 23 of footrest 20), and is illustratively equal to about 1 inch. If handlebar assembly 26 is positioned in touring mode position 32, distance A may be within a range of approximately 3 inches to 7 inches, and is illustratively equal to about 7 inches. If handlebar assembly 26 is positioned in 2-up mode position 32, distance A may be within a range of approximately −5 inches to −1 inch, and illustratively is equal to about −5 inches (5 inches in front of forward wall 23 of footrest 20). The 2-up mode position 32 allows the driver 42 to be positioned further forward on seat 18 to allow the passenger 44 to sit behind the driver 42 comfortably while maintaining vehicle stability.

FIG. 6 is another illustrative embodiment of ATV 10 shown with driver 42 and passenger 44 positioned on seat 18 of ATV 10. In this illustrative embodiment, handlebar assembly 26 is positioned in 2-up mode position 36. In the 2-up mode position 36, handlebar assembly 26 is positioned in front of footrests 20 of ATV 10. ATV 10 has an illustrative wheelbase 46, extending between the rotational axes 47 and 49 of the front and rear wheels 14 and 16, of less than 52 inches and greater than 49 inches. The 2-up mode position 36 of handlebar assembly 26 allows the driver's center of gravity 48 of be positioned almost directly over the vehicle's center of gravity 50 (i.e., vertically aligned) when passenger 44 is present. Similarly, the passenger's center of gravity 52 is positioned substantially proximate to center of gravity 54, which is the driver's center of gravity when handlebar assembly 26 is positioned in the sport mode position 32 and no passenger 44 is present. When in the 2-up mode, passenger 44 is positioned very close to the seating position of driver 42 when only driver 42 is riding with handlebar assembly 26 in sport mode position 34. Center of gravity 56 is the center of gravity of a fuel tank of ATV 10, which is illustratively positioned approximately 6 inches lower than in conventional ATVs. As detailed above, in this illustrative embodiment the distance A is the distance between axis 29 which extends vertically through a center of hand grip 27 of handlebar assembly 26 and forward wall 23 of footrest 20. Distance A may be any suitable distance, and illustratively between +/−5 to 10 inches.

With further reference to FIG. 6, seat 18 includes a lowered forward portion 19 longitudinally forward from traditional positions to allow driver 42 to slide forward when passenger 44 is present. The forward portion 19 is illustratively lowered by approximately 3 to 6 inches and is smoothly contoured and padded for comfort. In this embodiment, seat 18 also includes a suspension system, which is described in greater detail below, that allows seat 18 to move vertically distance D to provide a smooth ride to the riders of ATV 10. The suspension system may include a dual rate system that is adjustable for a single rider and 2-up riding. Distance D is illustratively between 2 and 3 inches. The handlebar position and seating arrangement of the riders shown in FIG. 3 moves the combined center of gravity of driver 42 and passenger 44 to the approximate location of the center of gravity 54, which is the center of gravity of the driver 42 only without passenger 44 when handlebar assembly 26 is positioned in the sport mode position. Maintaining relatively the same combined center of gravity of the ATV 10 and driver 42 and/or passenger 44 in the sport mode and the 2-up mode allows the ATV 10 to maintain relative stability in either orientation.

Figure 7:
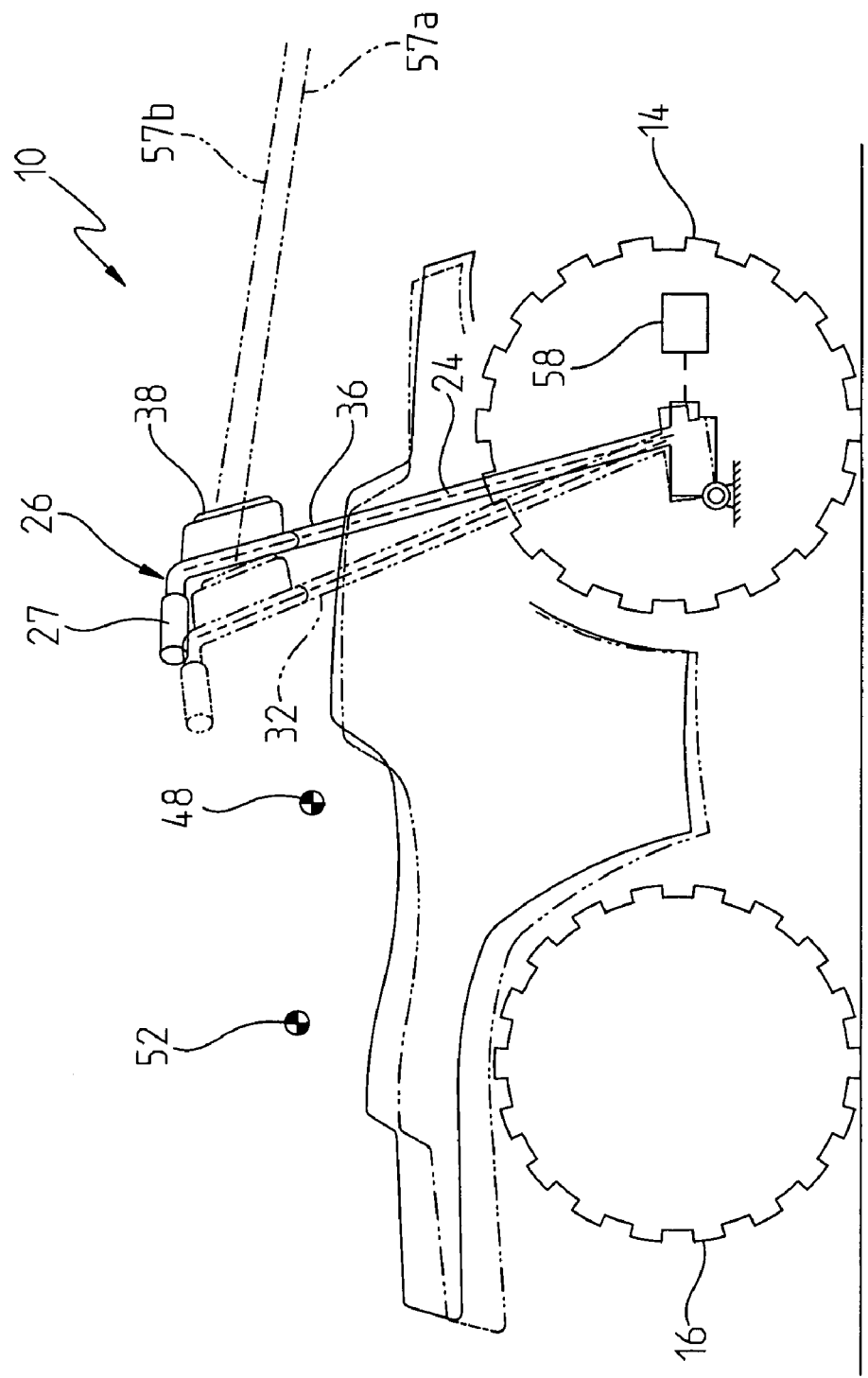
FIG. 7 is a diagrammatic left side view similar to FIG. 6 showing headlight adjustment in connection with changes in riding weight.

Referring now to FIG. 7, headlight 38 of ATV 10 is operably coupled to the steering post 24 and may be configured such that the illumination beam 57a has a proper angle of illumination or focus for a single rider in a default setting when handlebar assembly 26 is positioned in the sport mode position 32 (FIG. 2). Upon moving handlebar assembly 26 forward to the 2-up mode position 36, headlight 38 is focused at illumination beam 57b at a generally downward angle compared to when handlebar assembly 26 is in the sport mode position 32, as shown in FIG. 7. When passenger 44 mounts ATV and handlebar assembly 26 is in the 2-up mode position 36 as shown in FIGS. 6 and 7, the weight of passenger 44 lowers the back of ATV 10 and raises the illumination beam 57b of headlight 38 to the proper angle. In this manner, headlight 38 is properly focused when ATV 10 is in the 2-up mode without any manual adjustment necessary. In alternative embodiments, a mechanical adjustment assembly including an actuator (not shown) may be added to headlight 38 to automatically adjust the angle of illumination when handlebar assembly 26 is repositioned between the various positioned 32, 34, and 36 as detected by a steering post angle sensor 58.

Figure 8:
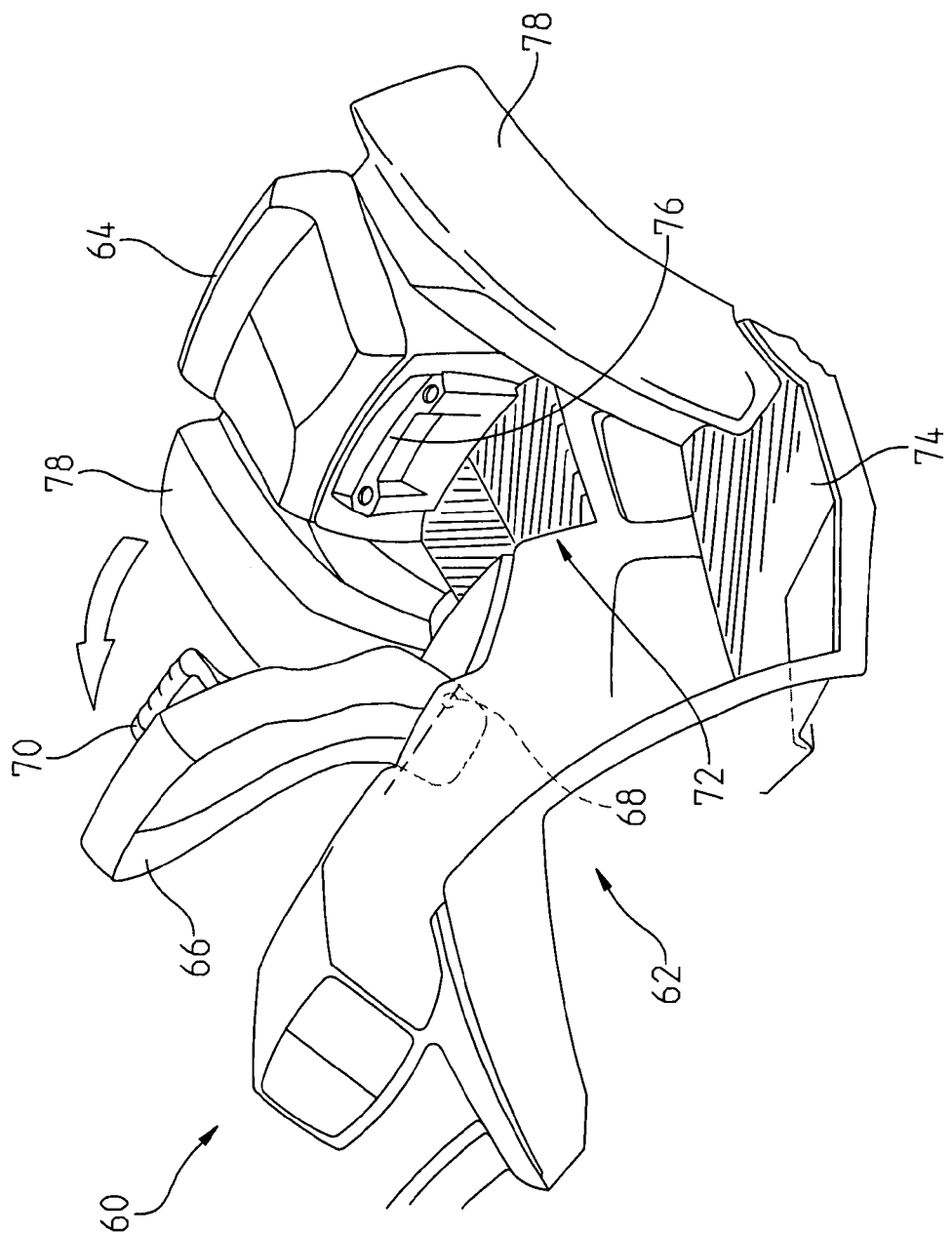
FIG. 8 is a partial perspective view of an illustrative embodiment ATV body including a step-through seat for easy access by a passenger.
Figure 9A:
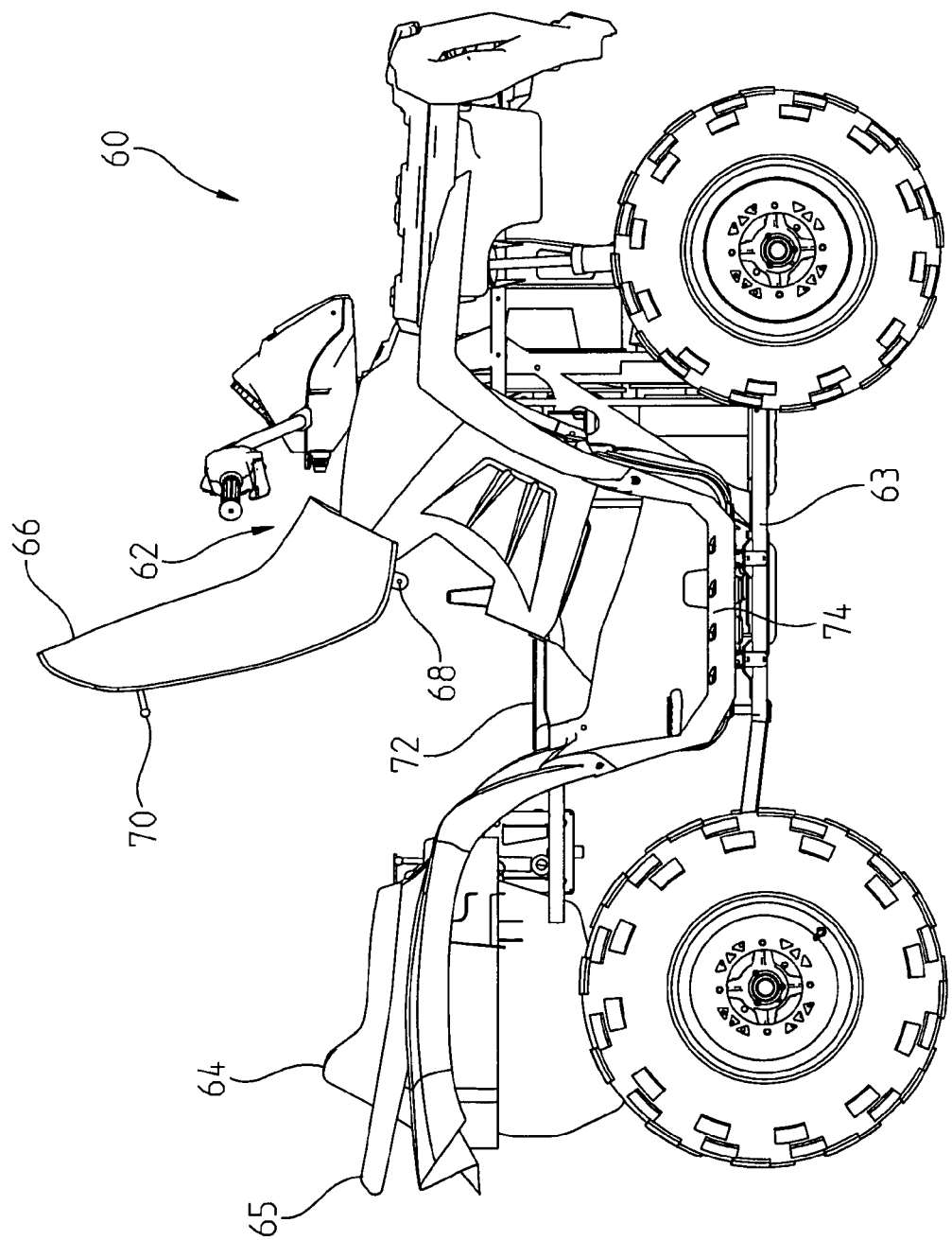
FIG. 9A is a side view of an illustrative embodiment ATV including a raised step-through seat similar to the embodiment shown in FIG. 8.
Figure 9B:
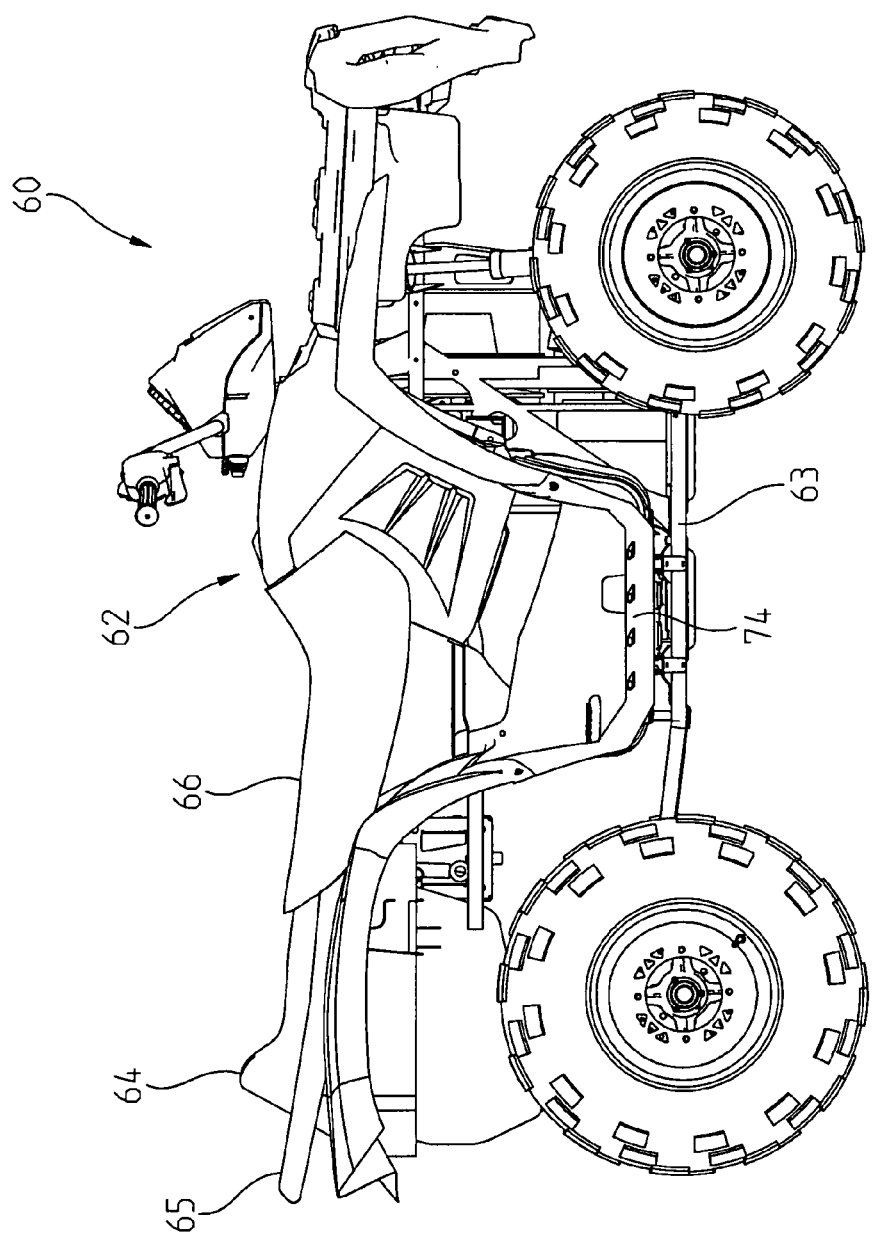
FIG. 9B is a side view of the ATV shown in FIG. 9A, with the step-through seat shown in the lowered position.

Referring now to FIG. 8, an exemplary embodiment of an ATV 60 similar to ATV 10 is shown. ATV 60 includes body 62 which is mounted on a frame 63 similar to frame 12 of ATV 10. Body 62 includes front seat 66, footrest 74, rear fenders 78, lower level 72, and rear seat 64. Front seat 66 is pivotally coupled to body 62 at pivot 68. Front seat 66 may be lifted to allow a passenger to step on or step through lower level 72 when mounting ATV 60 and attempting to sit on rear seat 64. Front seat 66 also includes handle 70 positioned on the bottom surface to provide a griping surface for the passenger during the mounting process. Handle 70 could be designed to abut ledge 76 of body 62 to support front seat 66 when front seat 66 is lowered into the riding position. FIGS. 9A and 9B illustrate front seat 66 in the raised mounting position and the lowered riding position, respectively. When mounting ATV 60, a passenger first lifts front seat 66 then steps on footrest 74 and either steps on lower level 72 or moves his or her foot through the void above lower level 72 to opposing footrest 74 on the opposite side of ATV 60. The passenger then sits on rear seat 64 and lowers front seat 66 until handle 70 contacts ledge 76. The driver may then mount ATV 60.

Figure 10A:
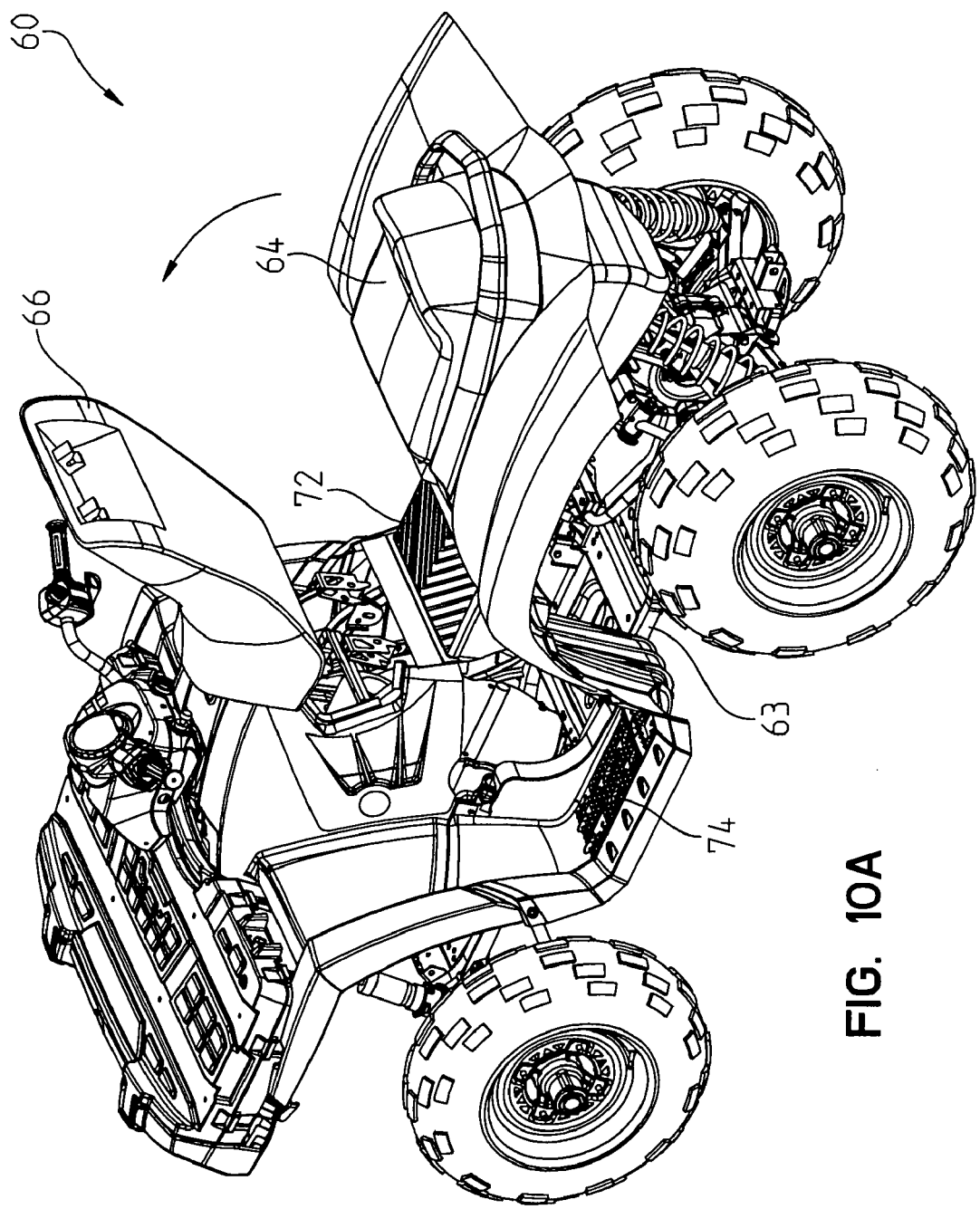
FIG. 10A is another perspective view of the ATV shown in FIGS. 9A and 9B, with the step-through seat shown in the raised position.
Figure 10B:
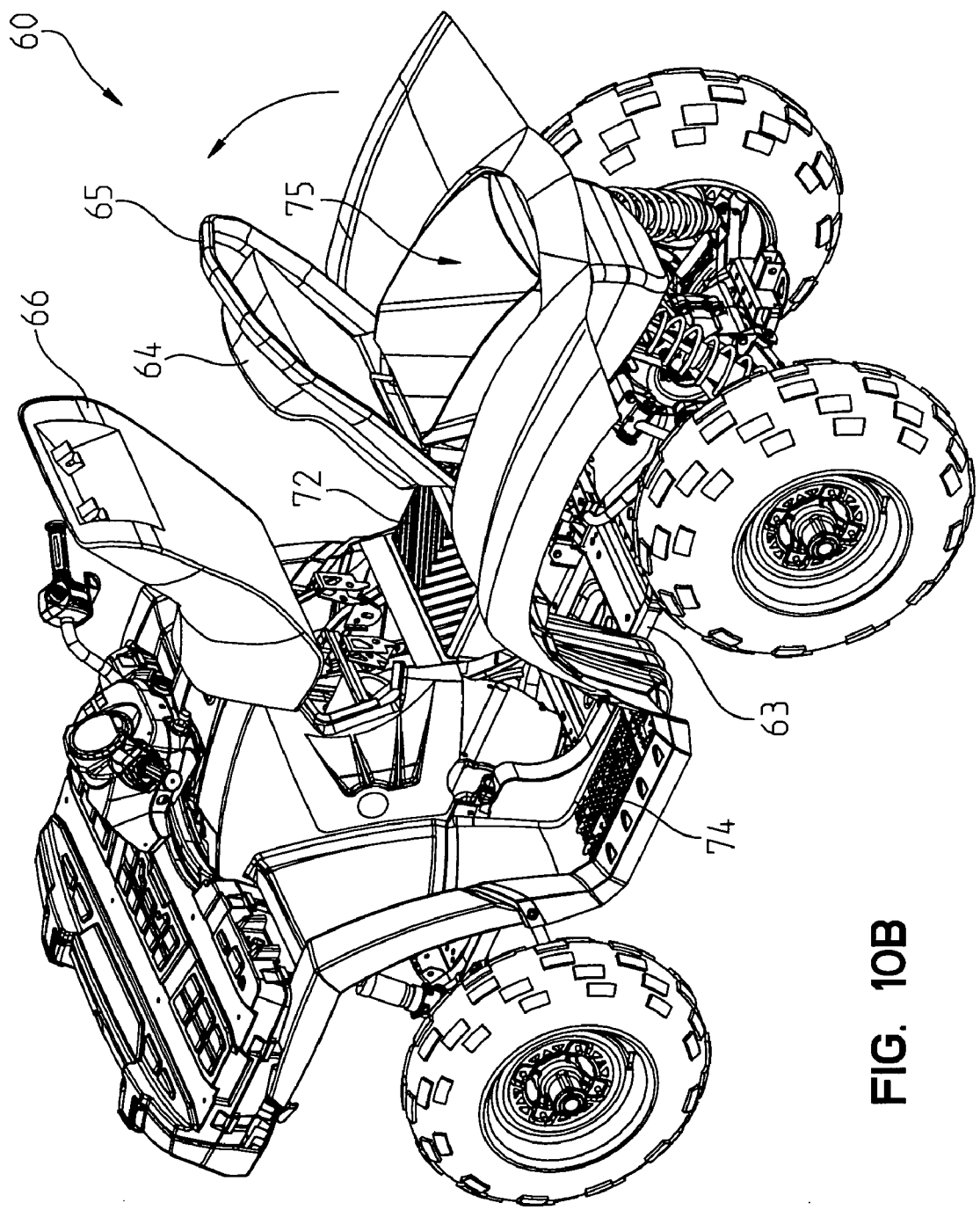
FIG. 10B is another perspective view of the ATV shown in FIGS. 9A, 9B, and 10A, with the step-through seat shown in the raised position and the rear seat shown in the raised position.
Figure 10C:
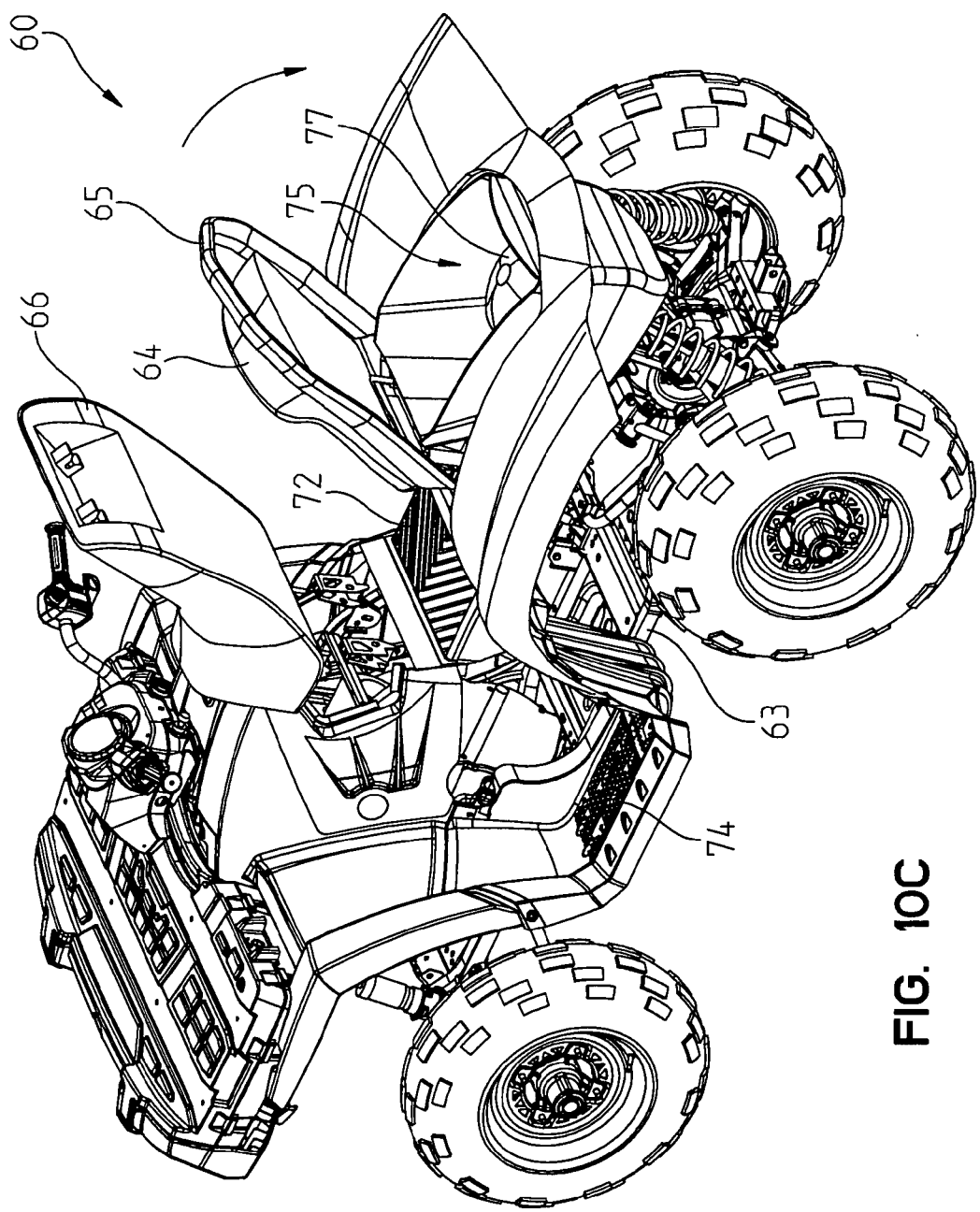
FIG. 10C is another perspective view of the ATV shown in FIGS. 9A, 9B, 10A, and 10B, with the step-through seat and the rear seat shown in the raised position.
Figure 10D:
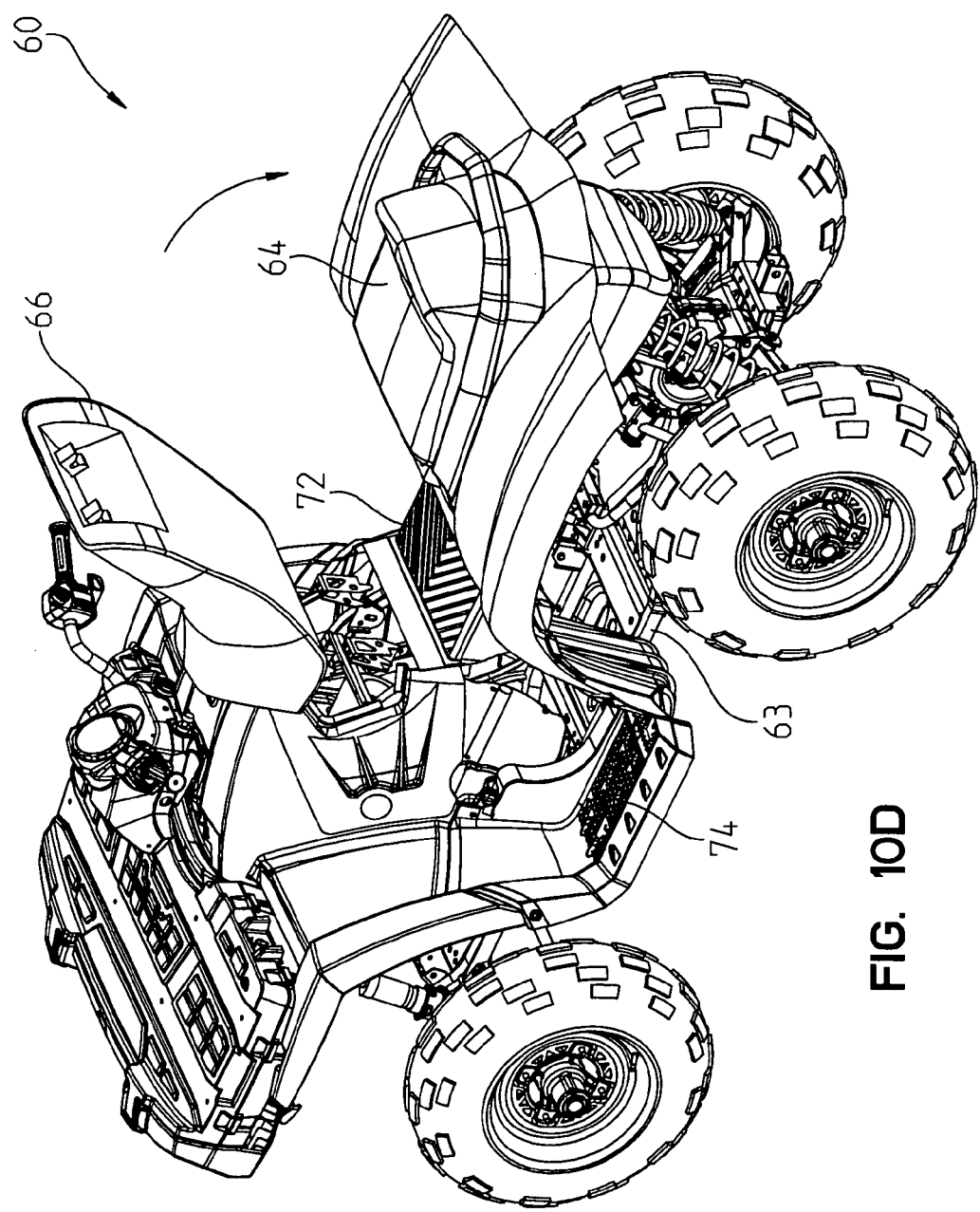
FIG. 10D is another perspective view of the ATV shown in FIGS. 9A, 9B, 10A, 10B, and 10C, with the step-through seat shown in the raised position and the rear seat shown in the lowered position.
Figure 11A:
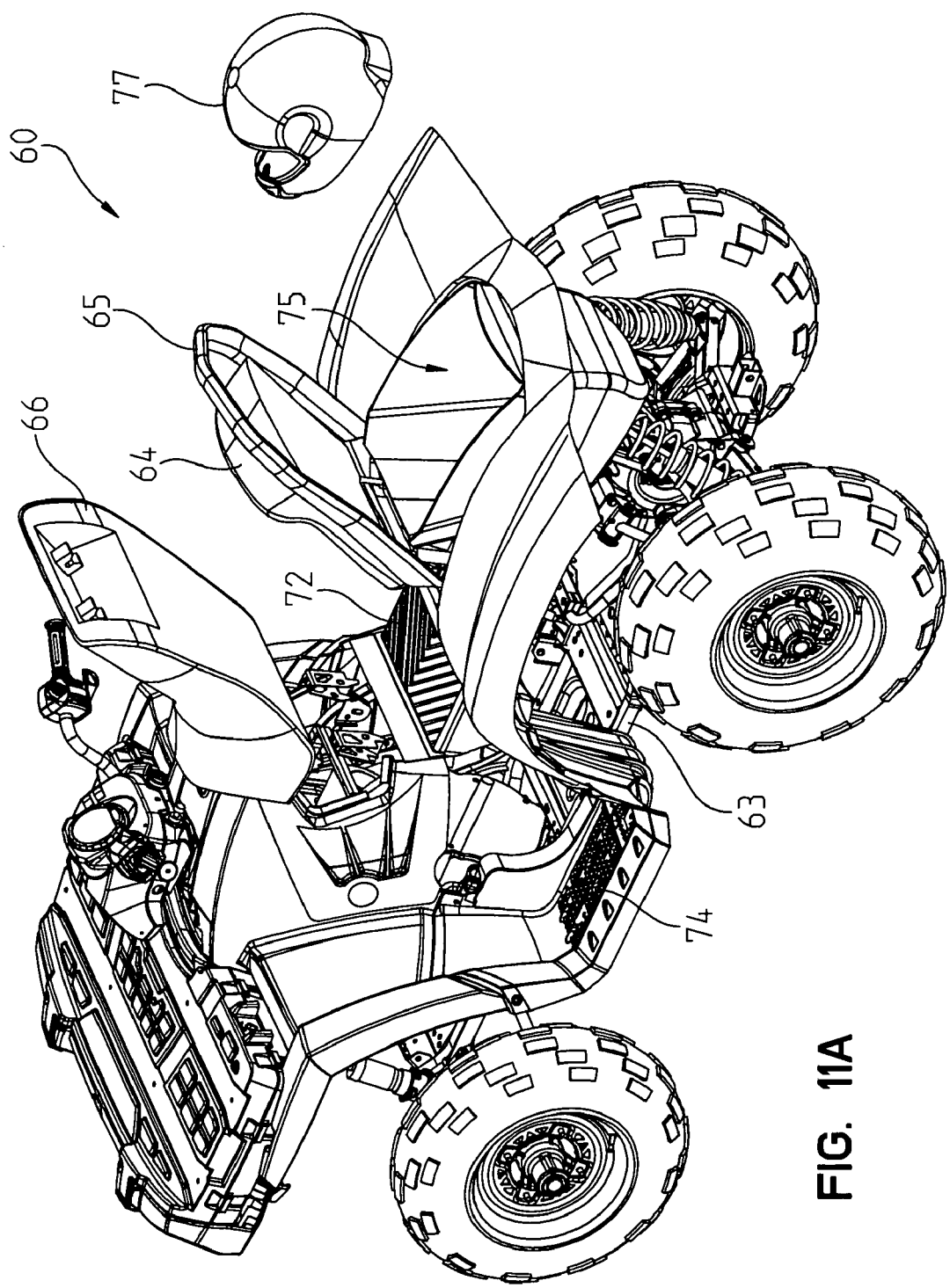
FIG. 11A is perspective view of the ATV shown in FIGS. 9A, 9B, and 10A-D, with the step-through seat and the rear seat shown in the raised position, and a helmet being inserted in a compartment below the rear seat.
Figure 11B:
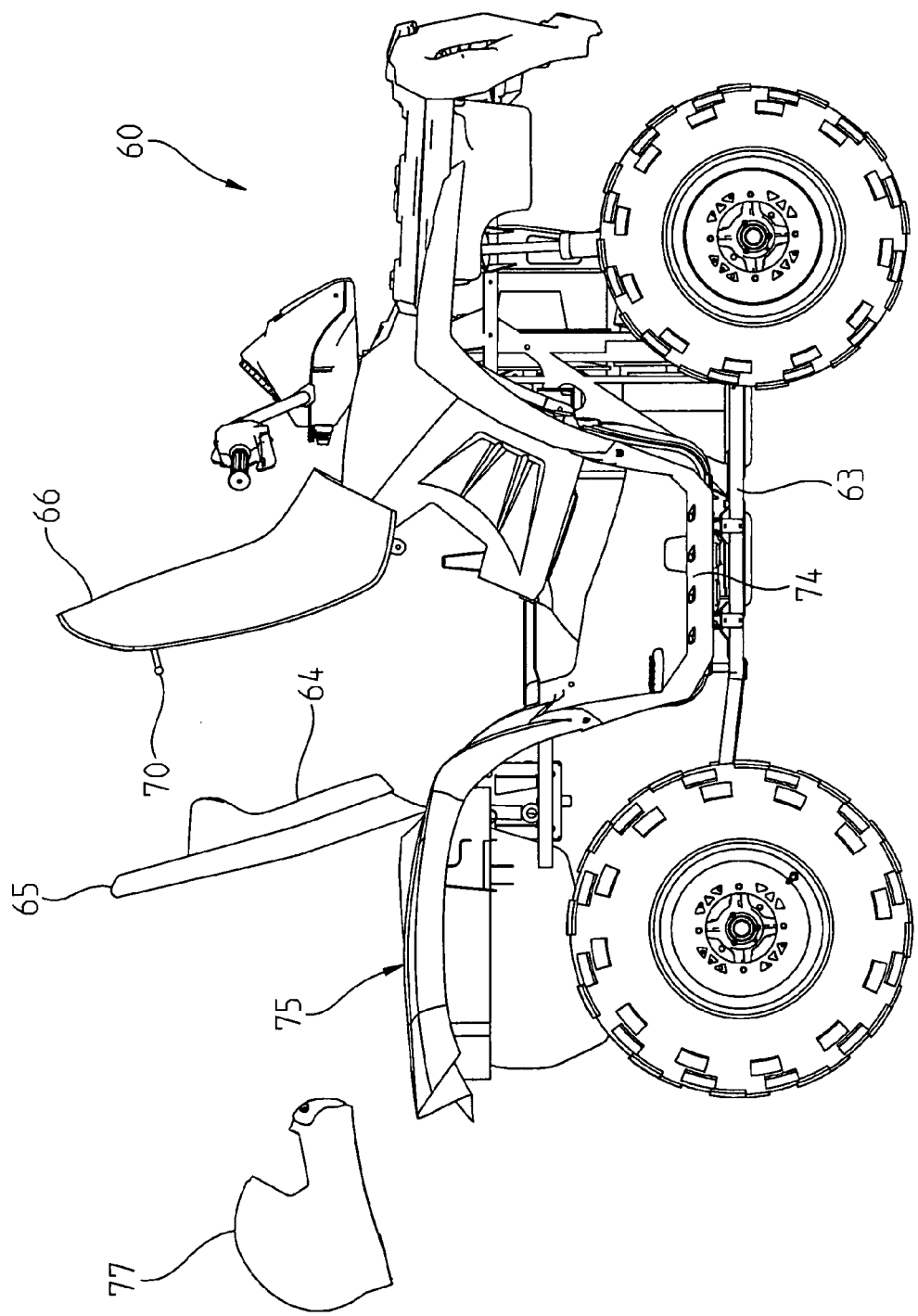
FIG. 11B is side elevational view of the ATV shown in FIG. 11A, with the step-through seat and the rear seat shown in the raised position, and a helmet being inserted in a compartment below the rear seat.

FIGS. 10A-10D, 11A, and 11 B illustrate an additional feature that may be included on ATV 60. Rear seat 64 may also be adapted to pivot upward and expose compartment 75. Compartment 75 may be used to transport tools, food, a full size helmet, or any other suitable material. As shown in FIGS. 10B, 11A, and 11B handle 65 of rear seat 64 may be lifted to pivot rear seat 64 upward. After an item such as helmet 77 is placed in compartment 75, rear seat 64 is lowered back into the riding position as shown in FIG. 10D.

Figure 12A:
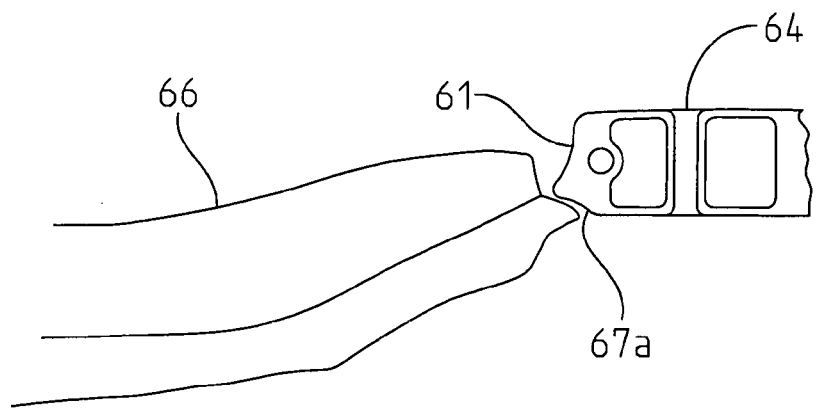
FIG. 12A is a diagrammatic side view showing the step-through seat secured in a lowered position by a backrest in a lowered position.
Figure 12B:
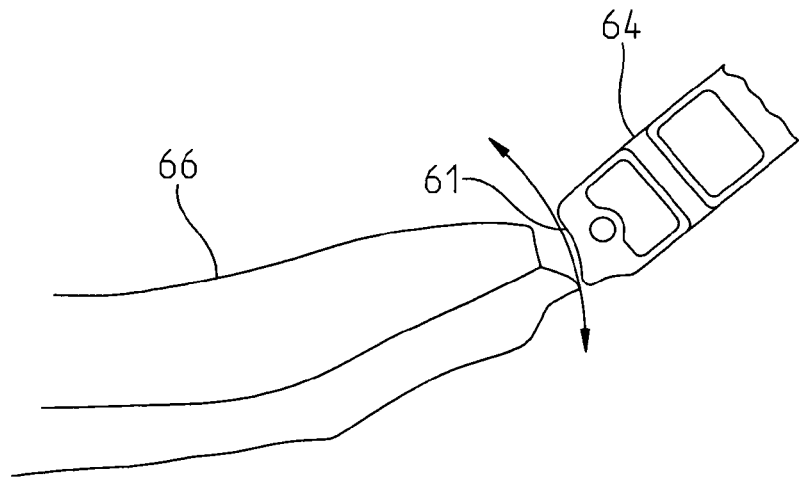
FIG. 12B is a diagrammatic side view similar to FIG. 12A showing the backrest free to move relative to the seat.
Figure 12C:
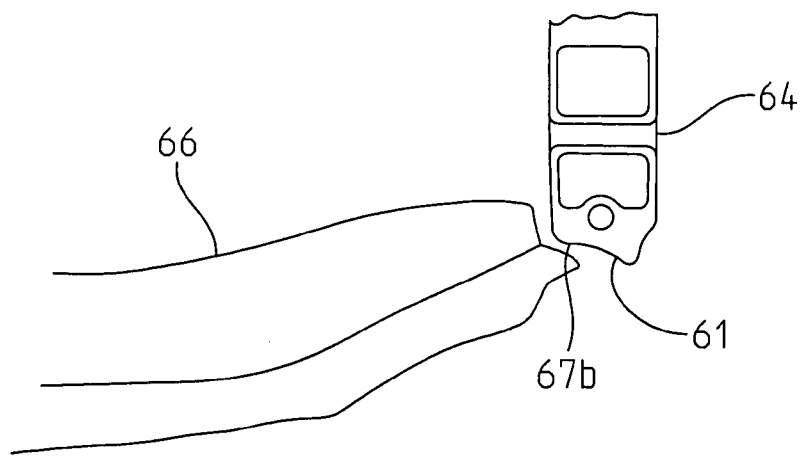
FIG. 12C is a diagrammatic side view similar to FIG. 12A showing the step-through seat secured in a lowered position by the backrest in a raised position.

Both front seat 66 and rear seat 64 may be secured in their respective lowered positions by a conventional releasable latch assembly. As shown in FIGS. 12A-12C, the rear seat 64, or alternatively backrest 40, may cooperate with the front seat 66 to secure the front seat 66 in its lowered position. More particularly, rear seat 64 includes a contoured forward edge surface 61 having a first locking portion 67a and a second locking portion 67b. As shown in FIG. 12A, locking portion 67a secures the front seat 66 when the rear seat 64 is fully lowered. Similarly, as shown in FIG. 12C, locking portion 67b secures the front seat 66 when the rear seat 64 is fully raised. When the rear seat 64 is in a position intermediate the fully lowered position and the fully raised position (FIG. 12B), the front seat 66 is free to pivot between lowered and raised positions.

FIGS. 13A and 13B illustrate another additional feature that may be included on ATV 60. ATV 60 may also include suspension system 80 to improve the ride of ATV 60. Suspension system 80 includes shock absorber 84 and is coupled between bracket 86 supported by front seat 66 and bracket 82 supported by frame 63. Shock absorber 84 allows front seat 66 to pivot about pivot 68 and allows rear seat 64 to pivot about pivot 69, thereby lessening the effects of rough or uneven terrain that ATV 60 may encounter. Also shown in this illustrative embodiment, rear handles 79 have be added to rear fenders 78 to allow a passenger to hold onto during riding to when mounting ATV 60. Compartment 75 is also shown in FIG. 13A. FIG. 13B is an alternative embodiment of ATV 60' in which rear seat 64 has been replaced by cover 88 and seat pad 89. Cover 88 may be constructed of rigid plastic, fiberglass, or any other suitable material. Seat pad 89 in conjunction with cover 88 provides a traditional look to the rear of the ATV 60 with the aforementioned seat suspension capabilities. In certain embodiments, cover 88 may also provide an additional seating surface for the rider of ATV 60. The embodiment shown in FIG. 13B is intended to a single passenger ATV 60' rather than 2-up capable ATV 60 shown FIG. 13A.

Figure 14A:
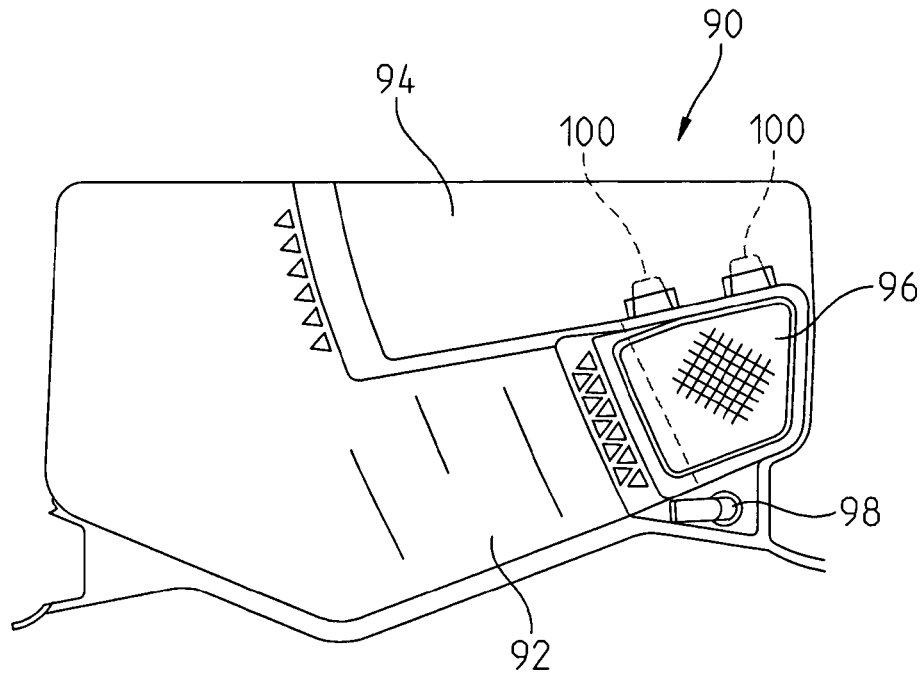
FIG. 14A is a top view of a footrest of an ATV, in accordance with certain illustrative embodiments of the present disclosure.
Figure 14B:
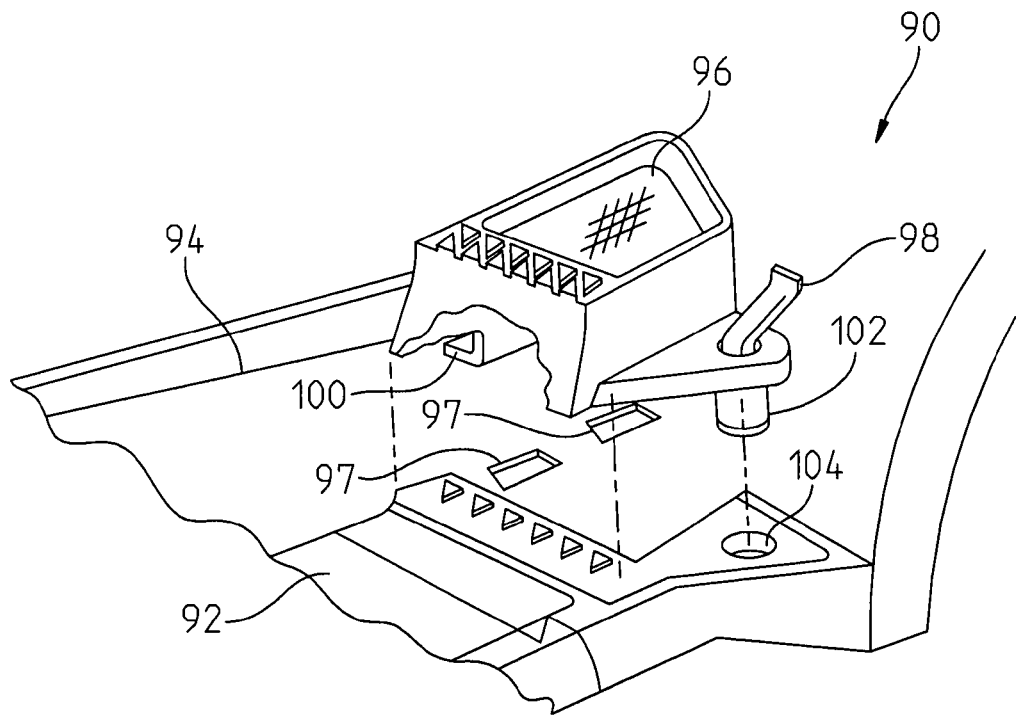
FIG. 14B is a perspective view of the footrest shown in FIG. 14A.

Referring now to FIGS. 14A and 14B, one embodiment of a footrest or footwell 90 for a 2-up ATV, such as ATVs 10 and 60, is shown. Footrest 90 is configured to provide adequate room for both a driver's foot and a passenger's foot. In this illustrative embodiment, footrest 90 includes platform 92 and removable passenger foot support or pedestal riser 96. Passenger foot support 96 includes tabs 100 and releasable coupler 98 for removably coupling the passenger foot support 96 to platform 92. Releasable coupling 98 includes a locking lever coupled to a locking assembly 102 on the bottom side of passenger foot support 96. To install passenger foot support 96 in footrest 90, tabs 100 are positioned in slots 97 in platform 92 and locking assembly 102 is positioned in aperture 104 in platform 92. The locking lever is then depressed or pivoted to engage locking assembly 102 securely in aperture 104. The coupler 98 or mounting system used to couple passenger foot support 96 to platform 92 may be described as an accessory retainer apparatus similar to the type described in U.S. Pat. No. 7,055,454, the disclosure of which is expressly incorporated by reference herein. It should be noted that any other suitable method of securing passenger foot support 96 to platform 92 may be used. Additionally, passenger foot support 96 may be constructed to a variety of heights or shapes to accommodate passengers of various sizes.

Figure 15:
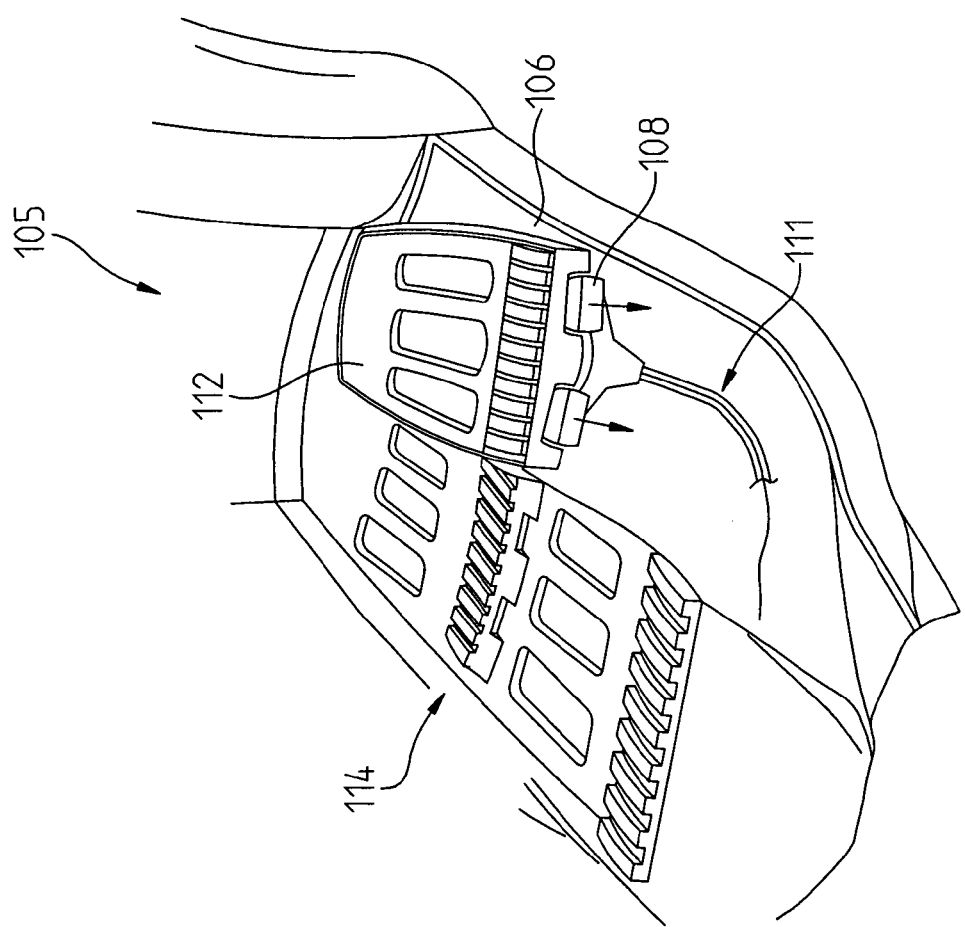
FIG. 15 is a perspective view of another illustrative embodiment footrest of an ATV.
Figure 16:
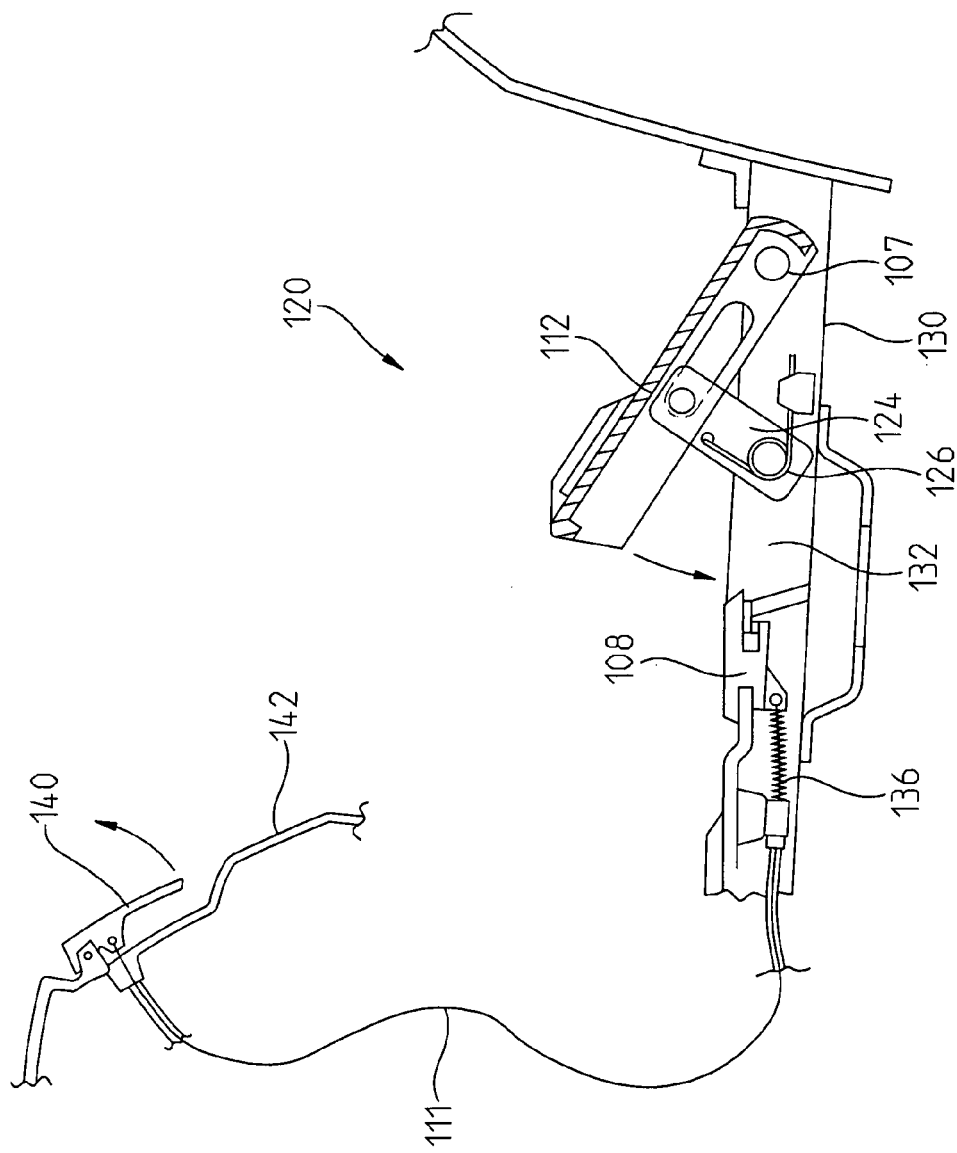
FIG. 16 is a side view, in partial schematic, of the footrest of FIG. 15.

FIGS. 15 and 16 show another illustrative embodiment of a passenger foot support of a 2-up ATV, such as ATVs 10 and 60. In this embodiment, footrest or footwell 105 includes a plurality of hinged plates 112. Plates 112 are coupled to platform 106 by pivots or hinges 107 and are moveable between a raised position and a lowered position. Springs 126 may be used to bring the plates 112 in either the raised or lowered position. In the lowered position, plates 112 fit with recesses 132 in platform 106 to provide a flat floorboard area for a rider's foot. Lock down tabs or latches 108 are illustratively provided to lock or secure the plates 112 in the lowered position. When riding in a 2-up mode with a passenger, plates 112 may be raised up to provide an elevated surface for the passenger's foot to contact. It should be understood that plates 112 may include any suitable form of traction control devices 114, such as projections or apertures, on either or both upper and lower surfaces of plates 112 to prevent slippage by riders.

FIG. 16 further illustrates the passenger foot support of FIG. 15. As detailed above, plate 112 is pivotally coupled to platform 166 at pivot 107 and is adapted to fit within recess 132 when in the retracted position. Spring 126 and linkage 124 bias plate 112 upward when lever 140 is actuated. Lever 140 is positioned on panel 142 of the ATV. When pulled, lever 140 actuates wire 111 to retract latch 108 against spring 136 and to release plate 112 from the flat or retracted position. Depressing plate 112 into recess 132 forces latch 108 to reengage plate 112 and maintain it in the flat position until lever 140 is pulled again. Plate 112 may be in the flat position when only a single rider is riding the ATV, but may be actuated to the raised position to provide a passenger foot support when a driver and passenger are riding the ATV in the 2-up mode.

Figure 17:
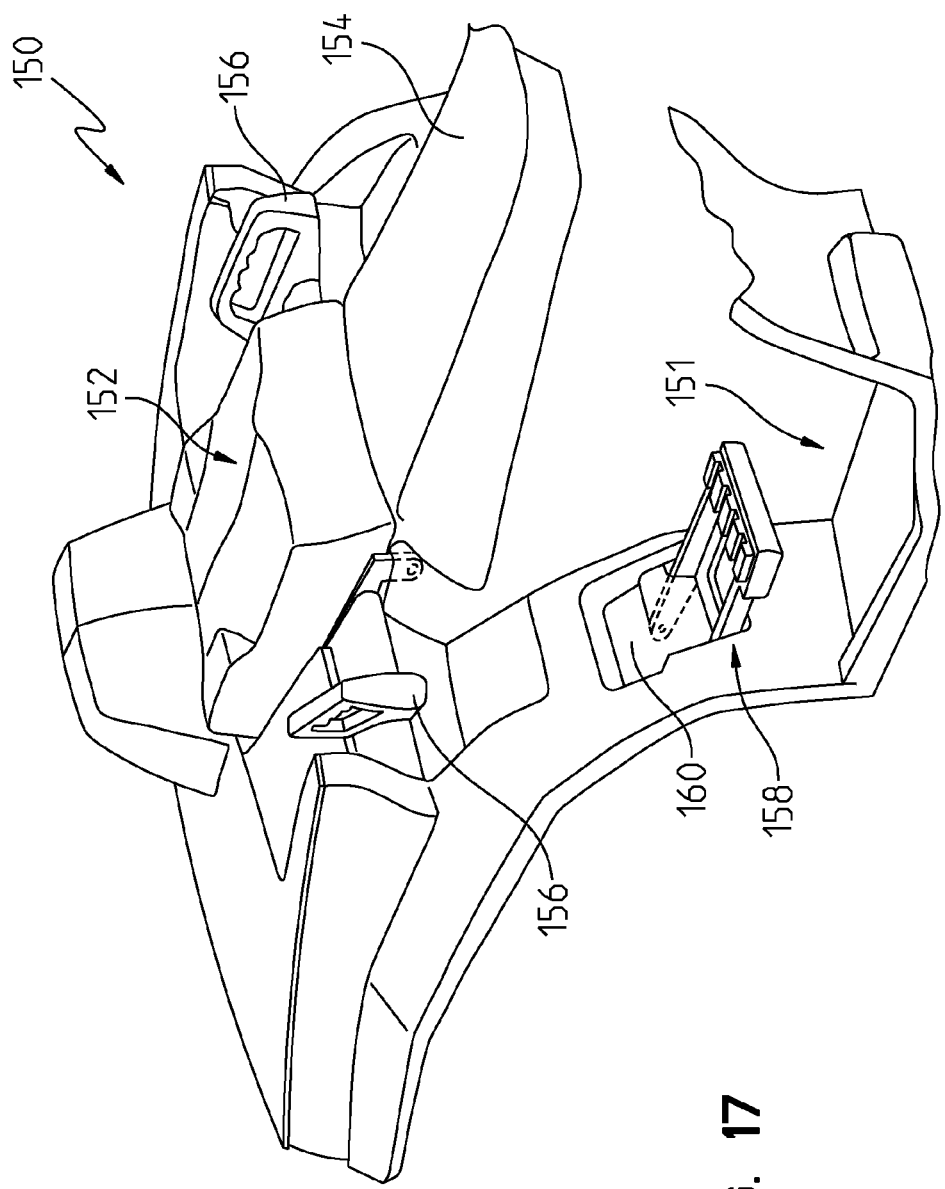
FIG. 17 is a partial perspective view of an illustrative embodiment 2-up ATV body.

FIG. 17 illustrates another embodiment of a passenger foot support for a 2-up ATV, such as ATVs 10 and 60. In this illustrative embodiment, footrest or footwell 151 of body 150 of the ATV includes retractable passenger foot support 158. Foot support 158 may be rotated upward into recess 160 of body 150 when not in use. Also illustrated in this embodiment are handles 156 positioned on both sides of rear seat 152. When a passenger is mounting the ATV, either handle 156 may be used for balance as the passenger attempts to lift his or her leg over front seat 154. Additionally, handles 156 may provide support for the passenger during the riding experience.

Figure 18:
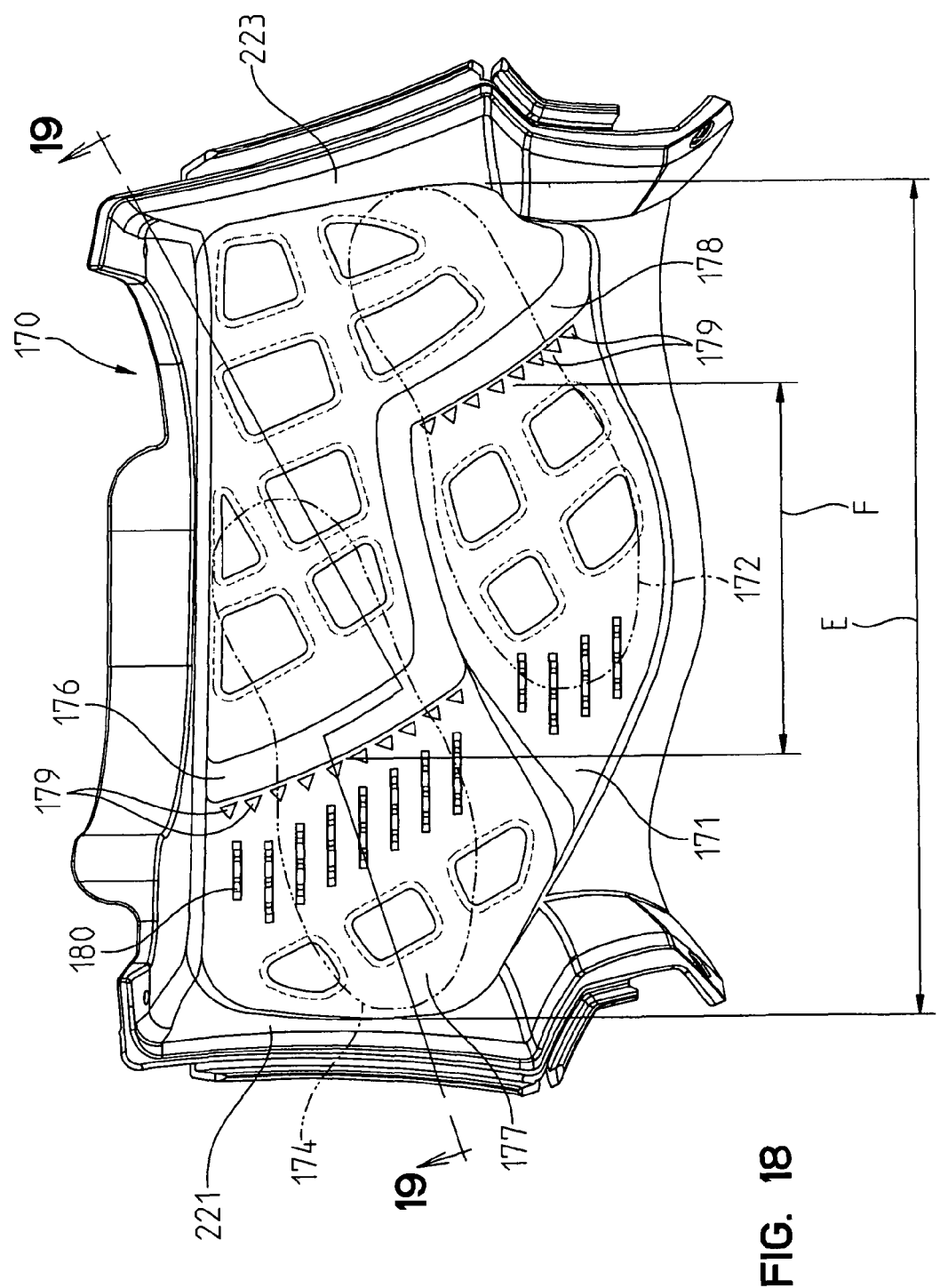
FIG. 18 is a top view of an illustrative embodiment footrest of an 2-up ATV.
Figure 19:
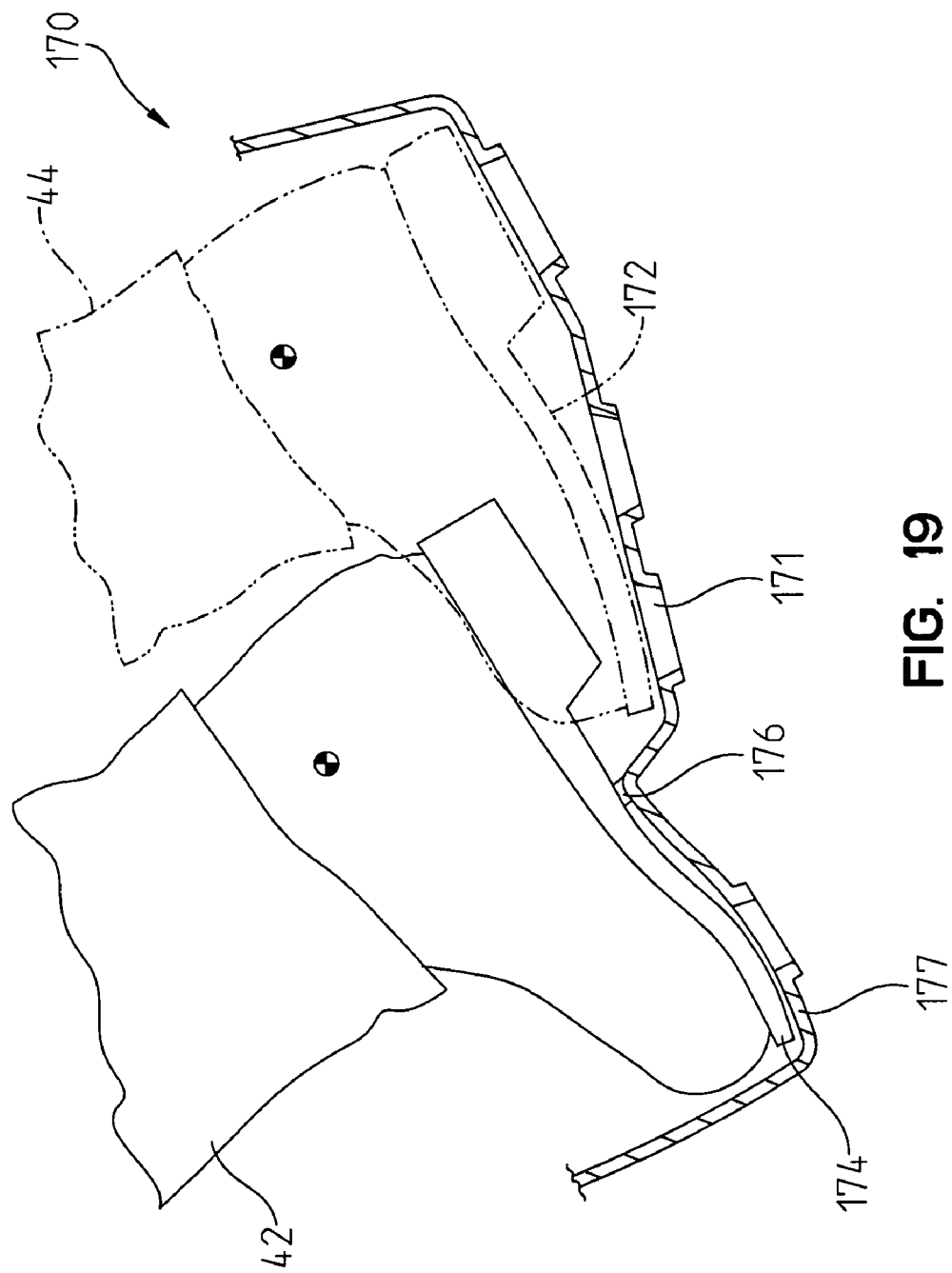
FIG. 19 is a cross-sectional view of the footrest of FIG. 17 taken along line 19-19.

FIGS. 18 and 19 show an illustrative embodiment of a footrest or footwell of a 2-up ATV, such as ATVs 10 and 60, that meet the guidelines of ANSI as detailed above, fits within the space of a standard ATV footwell length (i.e., approximately 17 inches), and is comfortable for one or two feet. Footrest 170 includes a platform 171 formed to provide room for both the driver's foot 174 and the passenger's foot 172 while having a length E between front wall 221 and rear wall 223 (extending substantially parallel to longitudinal axis 13 of ATV 10, 60) not exceeding 17 inches. Raised surfaces 176 and 178 include elevated grip portions 179 that define foot pegs for the driver's boot 174 and passenger's boot 172 to reduce leg and foot fatigue during the riding experience and to aid in position and vehicle control. Footrest 170 may also include traction devices 180 to reduces boot slippage. In this exemplary embodiment, distance F between the forward center portions of raised surfaces 176 and 178 is equal to at least about 9 inches, however any suitable arrangement may be used. As illustrated in FIG. 19, the inner forward portion 177 of platform 171 located under the front or toe section of the driver's foot is illustratively angled down to the front by approximately 5 to 15 degrees from horizontal in order to improve driver comfort in the two-up mode of operation.

Figure 20A:
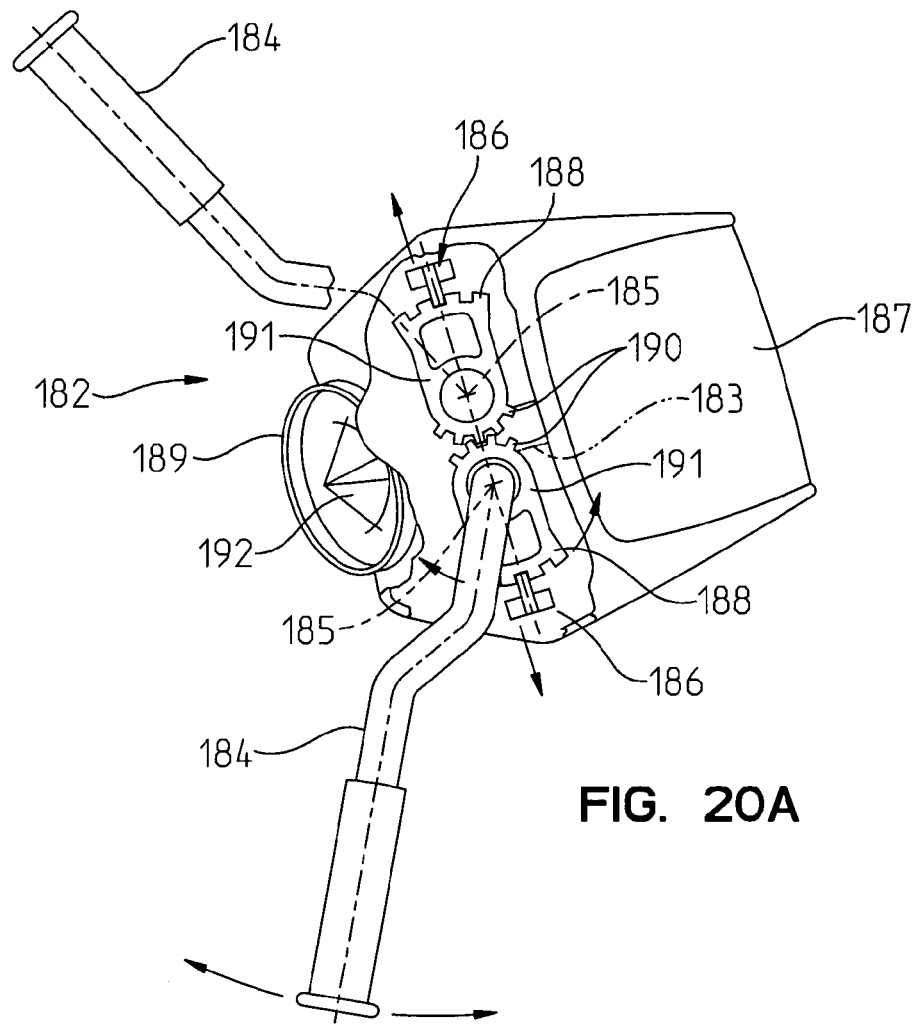
FIG. 20A is a top view of an adjustable handlebar assembly of an ATV, in accordance with certain illustrative embodiments of the present disclosure.
Figure 20B:
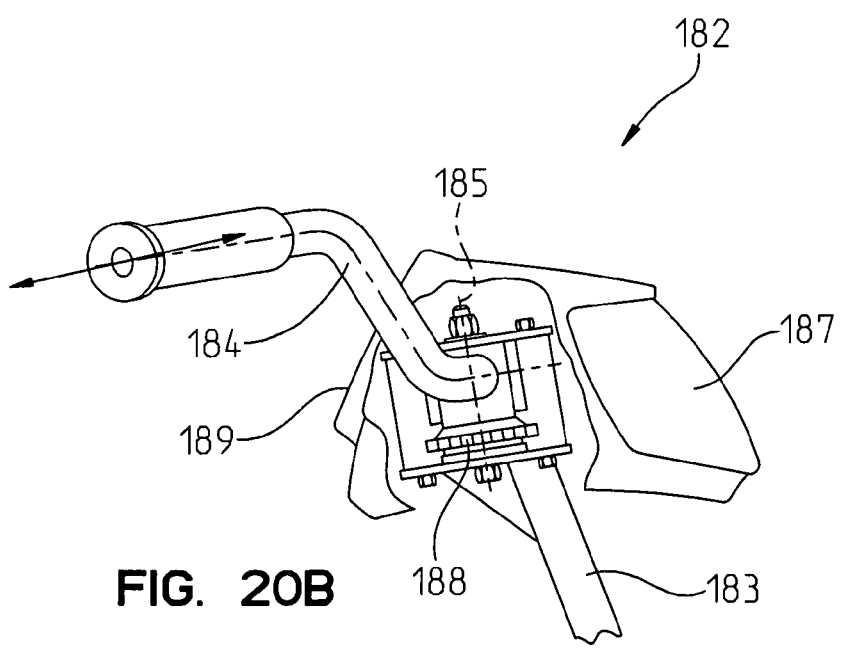
FIG. 20B is a side view of the handlebar assembly shown in FIG. 20A, in accordance with an alternate embodiment of the present disclosure.

FIGS. 20A and 20B are illustrative embodiments of an alternative adjustable handlebar assembly 182 that may be used on an ATV to move the handgrips and driver forward or backward on the ATV to change the riding style or carry a passenger as described above. Handlebar assembly 182 includes two handlebars 184 (only one shown in FIGS. 14a and 14b) and housing 189. Housing 189 may include headlight 187 and/or gauge 192. Housing 189 encloses posts 185 which are coupled to handlebars 184. Plates 191 are coupled to posts 185. Teeth 188 are formed on one end of plates 191 and teeth 190 are formed on the opposing end of plates 191. Teeth 188 are engaged by locking tabs 186 to maintain handlebars 184 in position. Releasing locking tabs 186 from teeth 188 allows handlebars 184 to rotate about an axis defined by posts 185. Teeth 188 engage one another to simultaneously move one of the handlebars 184 if the opposing handlebar 184 to moved. In this manner, handlebars 184 may be simultaneously adjusted farther away from or closer to the driver while maintaining the proper alignment relative to one another. Handlebars 184 may be adjusted with out moving steering post 183. Locking tabs 186 may be biased against teeth 188 by a spring or any other suitable biasing mechanism. Similarly, locking tabs 186 may be actuated by a lever, switch, button, or any other suitable mechanism.

Figure 21B:
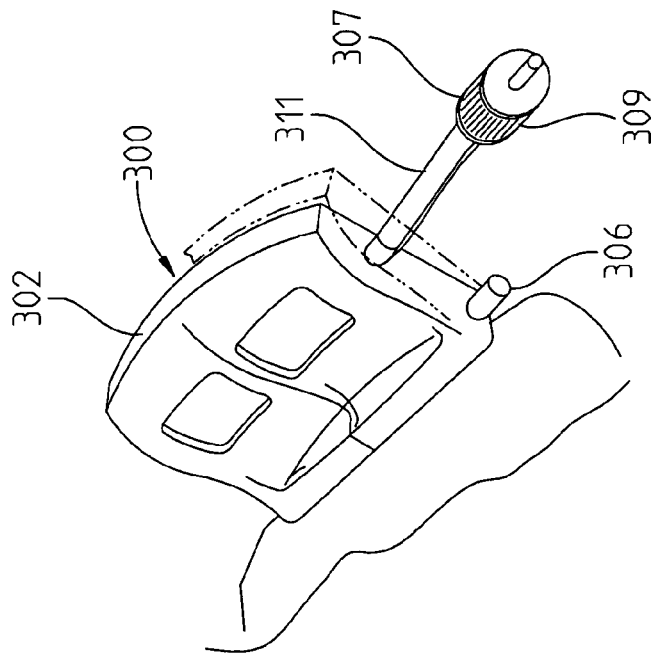
FIG. 21B is a partial top perspective view of the backrest of FIG. 21A in a raised position.
Figure 21A:
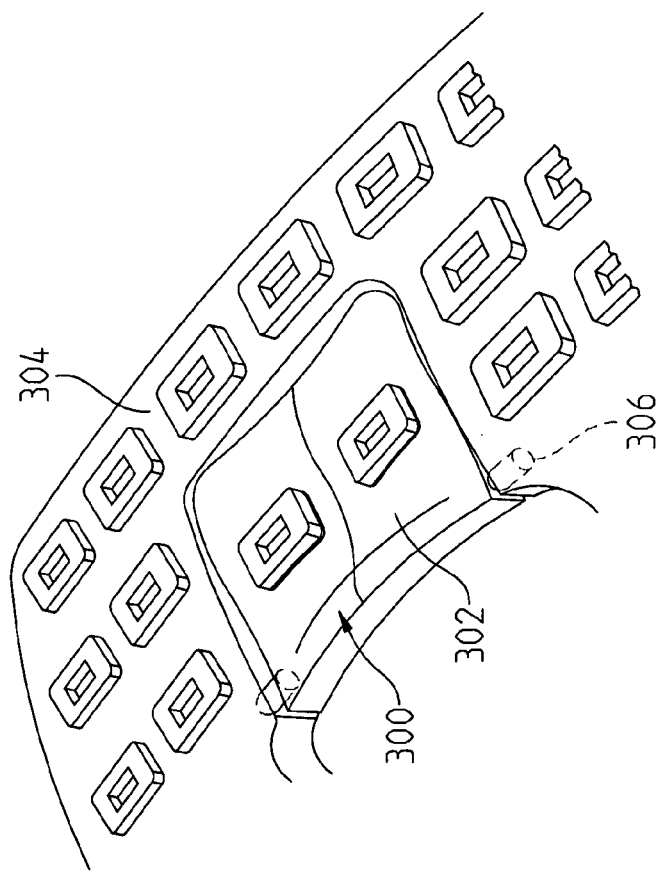
FIG. 21A is a partial top perspective view of a backrest in a lowered position within a rear mounting rack.

Referring now to FIGS. 21A and 21B, an illustrative backrest 300 is shown for use with ATV 10 or 60. The backrest 300 includes a body 302 supported to rear mounting rack 304 by a pivot or hinge 306. As such, backrest 300 may move between a lowered position stored flush with the mounting rack 304 (FIG. 15a) and a raised position extending substantially perpendicular to the mounting rack 304 (FIG. 15b). A vibration isolator 307 may be coupled to backrest 300 and frame 12 in order to reduce vibration within backrest 300. Isolator 307 illustratively includes a rubber connector 309 supported by an arm 311.

Figure 22A:
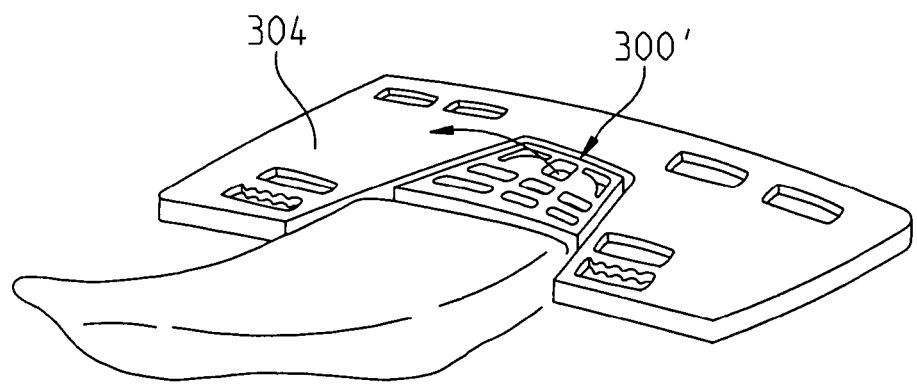
FIG. 22A is a top perspective view of a further illustrative embodiment backrest in a lowered position within a rear mounting rack.
Figure 22B:
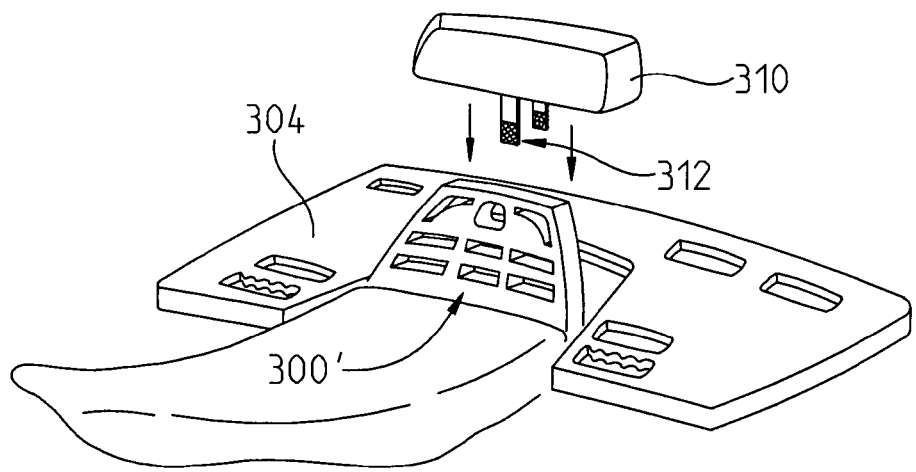
FIG. 22B is a top perspective view of the backrest of FIG. 22A in a raised position.
Figure 22C:
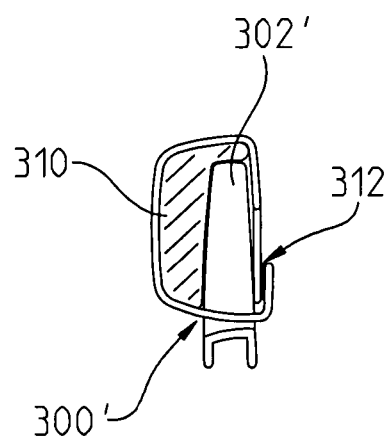
FIG. 22C is a side view showing a pad secured to the backrest of FIG. 22B.

FIGS. 22A-22C show a further illustrative backrest 300' which may receive a pad 310 thereover. Pad 310 may be releasably secured to body 302' through conventional fasteners, such as hook and loop fasteners 312. It may be appreciated that other fasteners, including but not limited to snaps and belts, may be substituted therefor.

Figure 23:
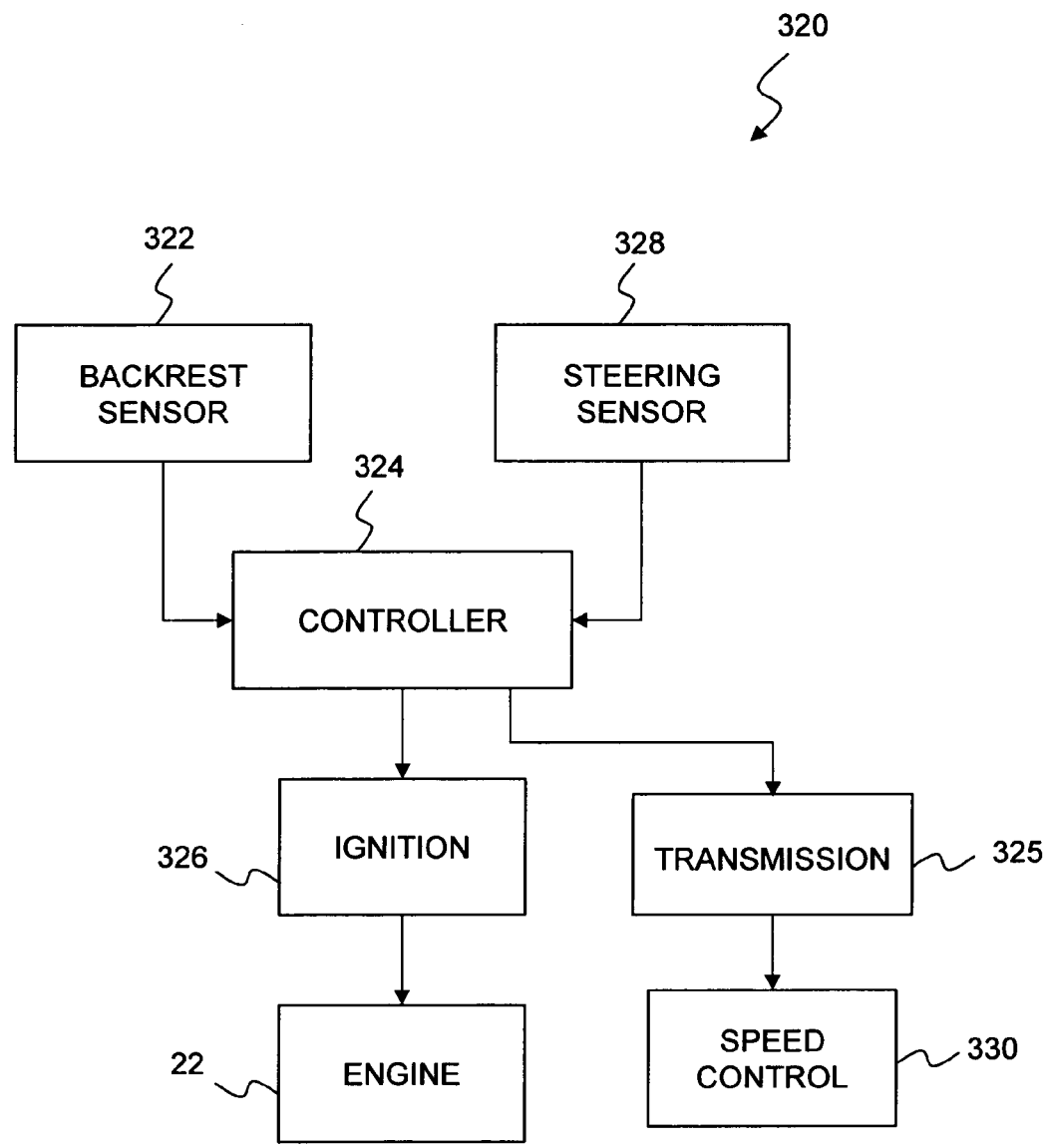
FIG. 23 is a block diagram of an illustrative position control system configured to ensure proper positioning of a driver when the vehicle is operated with a passenger.

With reference now to FIGS. 2 and 23, a position compliance or control system 320 may be provided to help ensure that the driver 42 is in a proper forward position when the vehicle 10 is operated with a passenger 44. A first, or backrest, sensor 322 is in communication with a controller 324 and is configured to detect when backrest 40, 300 is properly placed in a raised position. More particularly, when backrest sensor 322 detects the raised position of backrest 40, 300, controller 324 controls the drivetrain, illustratively including the engine 22 coupled to a transmission 325. In one illustrative embodiment, the controller 324 controls the ignition 326 by permitting normal starting and continued operation of engine 22 for all positions of steering post 24. A second or steering sensor 328 is also in communication with controller 324 and is positioned proximate steering post 24 to detect its operating position.

When steering sensor 328 detects that steering post 24 is in forward position 36, controller 324 permits the vehicle 10 to be operated with or without backrest 40, 300 in a raised position by controlling ignition 326. However, if steering sensor 328 detects that steering post 24 is not in forward position 36 and backrest sensor 322 detects that backrest 40, 300 is not properly placed in a raised position, then controller 324 controls ignition 326 to prevent normal operation of engine 22. Sensors 322 and 328 may be of conventional design and illustratively comprise limit switches. Sensors 322 and 328 ensure that steering post 24 and hence handlebar assembly 26 are in the forward position 36 if backrest 40, 300 is removed or not in a raised position, thus pulling the driver 42 and the passenger 44 forward into substantially the same position defined by having backrest 40, 300 in place.

In a further illustrative embodiment, the controller 324 controls transmission 325 which provides the function of a speed control 330. The speed control 330 may provide feedback to controller 324, such that transmission 325 limits the speed of the vehicle 10 if steering sensor 328 detects that steering post 24 is not in forward position 36 and backrest sensor 322 detects that backrest 40, 300 is not properly placed in a raised position.

Finally, one skilled in the art will appreciate that the present invention can be practiced with embodiments other than those disclosed. The disclosed embodiments are presented for purposes of illustration, not limitation, and numerous other embodiments and uses are intended to be encompassed by the invention.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all-terrain vehicle capable of transporting a driver and a passenger including:
   a frame defining a longitudinal axis;
   a pair of front wheels operably coupled to the frame;
   a pair of rear wheels operably coupled to the frame, a wheelbase being defined between the front wheels and the rear wheels;
   a straddle type seat supported by the frame and including multiple longitudinally spaced apart rider seating positions;
   wherein the wheelbase is less than 52 inches,
   a footrest configured with a driver foot position and a passenger foot position positioned laterally of each other and longitudinally overlapping, and
   a handlebar assembly moveable between a first position and a second position along the longitudinal axis, the first position defining only a first driver seating position on the seat, and the second position defining a second driver position and a passenger seating position on the seat, the second driver position being in front of the first driver position; and a vehicle center of gravity, wherein in the second driver position a center of gravity of the driver is substantially vertically aligned with the vehicle center of gravity.

2. The all-terrain vehicle of claim 1, wherein the wheelbase is at least 49 inches.

3. The all-terrain vehicle of claim 1, further comprising a headlight supported by the handlebar assembly and directing light along an angle of illumination, wherein the angle of illumination remains substantially constant when the handlebar assembly is moved between the first position with only a driver supported by the frame and the second position with both a driver and a passenger supported by the frame.

4. The all-terrain vehicle of claim 1, wherein the footrest is positioned laterally from the seat, the footrest including an inner portion with a downwardly angled toe section, and an outer portion spaced laterally outwardly from the inner portion and including an upwardly angled toe section.

5. The all-terrain vehicle of claim 1, wherein the footrest is supported laterally from the seat and having a platform, a passenger foot support, and a coupler removably coupling the passenger foot support to the platform.

6. The all-terrain vehicle of claim 1, wherein the footrest is supported laterally from the seat and having a platform, the platform defining a driver foot position and a rider foot position, and wherein the footrest has a length of less than approximately 17 inches.

7. The all-terrain vehicle of claim 1, further comprising:
a drivetrain supported by the frame and operably coupled to at least one of the wheels;
a controller operably coupled to the drivetrain;
a movable backrest supported by the frame;
a backrest sensor in communication with the controller and configured to detect the position of the backrest relative to at least one of the seat and the frame; and
wherein the controller controls operation of the drivetrain in response to input from the backrest sensor.

8. The all-terrain vehicle of claim 7, wherein the drivetrain includes an engine operably coupled to a transmission.

9. An all-terrain vehicle capable of transporting a driver and a passenger including:
a frame including longitudinally spaced-apart ends defining a longitudinal axis of the vehicle;
a plurality of wheels operatively coupled to the frame;
an engine supported by the frame;
a straddle type seat supported by the frame;
a handlebar assembly moveable between a first position and a second position along the longitudinal axis, the first position defining only a first driver seating position on the seat, the second position defining a second driver seating position and a passenger seating position on the seat, and wherein the vehicle has a vehicle center of gravity, and in the second driver position a center of gravity of the driver is substantially vertically aligned with the vehicle center of gravity.

10. The all-terrain vehicle of claim 9, further comprising a headlight supported by the handlebar assembly and directing light along an angle of illumination, wherein the angle of illumination remains substantially constant when the handlebar assembly is moved between the first position with only a driver supported by the frame and the second position with both a driver and a passenger supported by the frame.

11. The all-terrain vehicle of claim 9, further comprising a footrest having a forward wall, the first position of the handlebar assembly being behind the forward wall, and the second position of the handlebar assembly being in front of the forward wall.

12. The all terrain vehicle of claim 11, wherein the handlebar assembly includes a hand grip and a vertical axis extending through the center of the hand grip, the vertical axis being between approximately 3 inches and 7 inches behind the forward wall of the footrest when the handlebar assembly is in the first position, and the vertical axis being between approximately 1 inch and 5 inches in front of the forward wall of the footrest when the handlebar assembly is in the second position.

13. The all-terrain vehicle of claim 9, further comprising a steering post pivotably supported by the frame and supporting the handlebar assembly for movement between the first position and the second position.

14. The all-terrain vehicle of claim 9, wherein in the second driver position a center of gravity of the passenger is proximate to a center of gravity of the driver in the first driver position.

15. The all-terrain vehicle of claim 9, wherein the wheelbase is less than 52 inches.

16. The all-terrain vehicle of claim 9, further comprising a footrest positioned laterally from the seat, the footrest including an inner portion with a downwardly angled toe section, and an outer portion spaced laterally outwardly from the inner portion and including an upwardly angled toe section.

17. The all-terrain vehicle of claim 9, further comprising a footrest supported laterally from the seat and having a platform, a passenger foot support, and a coupler removably coupling the passenger foot support to the platform.

18. The all-terrain vehicle of claim 9, further comprising a footrest supported laterally from the seat and having a platform, the platform defining a driver foot position and a rider foot position, and wherein the footrest has a length of less than approximately 17 inches.

19. The all-terrain vehicle of claim 9, further comprising:
a drivetrain supported by the frame and operably coupled to at least one of the wheels;
a controller operably coupled to the drivetrain;
a movable backrest supported by the frame;
a backrest sensor in communication with the controller and configured to detect the position of the backrest relative to at least one of the seat and the frame; and
wherein the controller controls operation of the drivetrain in response to input from the backrest sensor.

20. The all-terrain vehicle of claim 19, wherein the drivetrain includes an engine operably coupled to a transmission.

21. An all-terrain vehicle including:
a frame including longitudinally spaced-apart ends defining a longitudinal axis of the vehicle;
a plurality of wheels operably coupled to the frame;
an engine supported by the frame;
a straddle type seat supported by the frame;
a footrest supported laterally from the seat and including a forward wall;
a steering column movable along the longitudinal axis of the vehicle from at least between a first position approximately 3 inches behind the forward wall to a second position approximately 1 inch in front of the forward wall, wherein the first position defines only a first driver seating position on the seat, and the second position defines a second driver seating position and a passenger seating position on the seat; and
a footrest positioned laterally from the seat, the footrest including an inner portion with a downwardly angled toe section, and an outer portion spaced laterally outwardly from the inner portion and including an upwardly angled toe section.

22. The all-terrain vehicle of claim 21, wherein the first position is approximately 7 inches behind the forward wall and the second position is approximately 5 inches in front of the forward wall.

23. The all-terrain vehicle of claim 21, further comprising a vehicle center of gravity, wherein in the second driver position a center of gravity of the driver is substantially vertically aligned with the vehicle center of gravity.

24. The all-terrain vehicle of claim 23, wherein in the second driver position a center of gravity of the passenger is proximate to a center of gravity of the driver in the first driver position.

25. The all-terrain vehicle of claim 21, further comprising a handlebar assembly supported by the steering column, wherein the steering column is pivotably supported by the frame.

26. The all-terrain vehicle of claim 21, wherein the wheelbase is less than 52 inches.

27. The all-terrain vehicle of claim 21, further comprising a footrest supported laterally from the seat and having a platform, a passenger foot support, and a coupler removably coupling the passenger foot support to the platform.

28. The all-terrain vehicle of claim 21, further comprising a footrest supported laterally from the seat and having a platform, the platform defining a driver foot position and a rider foot position, and wherein the footrest has a length of less than approximately 17 inches.

29. The all-terrain vehicle of claim 21, further comprising:
a drivetrain supported by the frame and operably coupled to at least one of the wheels;
a controller operably coupled to the drivetrain;
a movable backrest supported by the frame;
a backrest sensor in communication with the controller and configured to detect the position of the backrest relative to at least one of the seat and the frame; and
wherein the controller controls operation of the drivetrain in response to input from the backrest sensor.

30. The all-terrain vehicle of claim 29, wherein the drivetrain includes an engine operably coupled to a transmission.

31. An all-terrain vehicle comprising:
a frame including longitudinally spaced-apart ends defining a longitudinal axis of the vehicle;
a pair of front wheels operably coupled to the frame;
a pair of rear wheels operably coupled to the frame;
a straddle type seat supported by the frame; and
a footrest supported laterally from the seat and including a forward inner portion with a downwardly angled toe section, a forward outer portion with an upwardly angled toe section and a rearward outer portion aligned behind the forward outer portion, wherein multiple longitudinally spaced apart rider seating positions are defined, wherein the forward outer portion of the footrest partially overlaps with the rearward outer portion of the footrest, such that a driver's foot is supported by the forward inner portion when a passenger's foot is supported by the rearward outer portion.

32. The all-terrain vehicle of claim 31, wherein the footrest has a length of less than approximately 17 inches.

33. The all-terrain vehicle of claim 31, further comprising a handlebar assembly moveable between a first position and a second position along the longitudinal axis, the first position defining only a first driver seating position on the seat, and the second position defining a second driver position and a passenger seating position on the seat, the second driver position being in front of the first driver position.

34. An all-terrain vehicle including:
a frame defining a longitudinal axis;
a plurality of wheels operably coupled to the frame;
a drivetrain supported by the frame;
a controller operably coupled to the drivetrain;
a seat supported by the frame;
a movable backrest supported by the frame, having an up position defining a driver backrest and a down position defining a passenger seat;
a backrest sensor in communication with the controller and configured to detect the position of the backrest relative to at least one of the seat and the frame; and
wherein the controller controls operation of the drivetrain in response to input from the backrest sensor.

35. The all-terrain vehicle of claim 34, wherein the drivetrain includes an engine operably coupled to a transmission.

36. The all-terrain vehicle of claim 34, further including:
a steering post operably coupled to at least two of the wheels, the steering post movable between a first position and a second position along the longitudinal axis;
the first position forward of the second position;
a steering sensor in communication with the controller and configured to detect the position of the steering post; and
wherein the controller controls operation of the drivetrain in response to input from the steering sensor.

37. An all-terrain vehicle capable of transporting a driver and a passenger including:
a frame including longitudinally spaced-apart ends defining a longitudinal axis of the vehicle;
a plurality of wheels operatively coupled to the frame;
an engine supported by the frame;
a rear seat supported by the frame;
a front seat supported longitudinally in front of the rear seat, the front seat being configured to pivot relative to the frame for providing a lower level step through for a passenger; and
a suspension system coupled between the rear seat and the front seat and configured to permit the front seat and the rear seat to pivot relative to each other to lessen the effects of rough or uneven terrain.

38. An all-terrain vehicle including:
a frame including longitudinally spaced-apart ends defining a longitudinal axis of the vehicle;
a plurality of wheels operably coupled to the frame;
an engine supported by the frame;
a straddle type seat supported by the frame;
a footrest supported laterally from the seat and including a forward wall;
a steering column movable along the longitudinal axis of the vehicle from at least between a first position approximately 3 inches behind the forward wall to a second position approximately 1 inch in front of the forward wall; and
a footrest positioned laterally from the seat, the footrest including an inner portion with a downwardly angled toe section, and an outer portion spaced laterally outwardly from the inner portion and including an upwardly angled toe section.

39. The all-terrain vehicle of claim 38, wherein the first position is approximately 7 inches behind the forward wall and the second position is approximately 5 inches in front of the forward wall.

40. The all-terrain vehicle of claim 38, wherein the first position defines only a first driver seating position on the seat, and the second position defines a second driver seating position and a passenger seating position on the seat.

41. The all-terrain vehicle of claim 40, further comprising a vehicle center of gravity, wherein in the second driver position a center of gravity of the driver is substantially vertically aligned with the vehicle center of gravity.

42. The all-terrain vehicle of claim 41, wherein in the second driver position a center of gravity of the passenger is proximate to a center of gravity of the driver in the first driver position.

43. The all-terrain vehicle of claim 38, further comprising a handlebar assembly supported by the steering column, wherein the steering column is pivotably supported by the frame.

44. The all-terrain vehicle of claim 38, wherein the wheelbase is less than 52 inches.

45. The all-terrain vehicle of claim 38, further comprising a footrest supported laterally from the seat and having a platform, a passenger foot support, and a coupler removably coupling the passenger foot support to the platform.

46. The all-terrain vehicle of claim 38, further comprising a footrest supported laterally from the seat and having a platform, the platform defining a driver foot position and a rider foot position, and wherein the footrest has a length of less than approximately 17 inches.

47. The all-terrain vehicle of claim 38, further comprising:
a drivetrain supported by the frame and operably coupled to at least one of the wheels;
a controller operably coupled to the drivetrain;
a movable backrest supported by the frame;
a backrest sensor in communication with the controller and configured to detect the position of the backrest relative to at least one of the seat and the frame; and
wherein the controller controls operation of the drivetrain in response to input from the backrest sensor.

48. The all-terrain vehicle of claim 47, wherein the drivetrain includes an engine operably coupled to a transmission.

49. An all-terrain vehicle comprising:
a frame including longitudinally spaced-apart ends defining a longitudinal axis of the vehicle;
a pair of front wheels operably coupled to the frame;
a pair of rear wheels operably coupled to the frame;
a straddle type seat supported by the frame; and
a footrest supported laterally from the seat and including a forward inner portion with a downwardly angled toe section, and a forward outer portion with an upwardly angled toe section; and
a handlebar assembly moveable between a first position and a second position along the longitudinal axis, the first position defining only a first driver seating position on the seat, and the second position defining a second driver position and a passenger seating position on the seat, the second driver position being in front of the first driver position.

50. The all-terrain vehicle of claim 49, wherein the footrest further includes a rearward outer portion aligned behind the forward outer portion.

51. The all-terrain vehicle of claim 50, further comprising multiple longitudinally spaced apart rider seating positions, wherein the forward outer portion of the footrest partially overlaps with the rearward outer portion of the footrest, such that a driver's foot is supported by the forward inner portion when a passenger's foot is supported by the rearward outer portion.

52. The all-terrain vehicle of claim 49, wherein the footrest has a length of less than approximately 17 inches.

53. An all-terrain vehicle capable of transporting a driver and a passenger including:
a frame including longitudinally spaced-apart ends defining a longitudinal axis of the vehicle;
a plurality of wheels operatively coupled to the frame;
an engine supported by the frame;
a rear seat supported by the frame;
a front seat supported longitudinally in front of the rear seat; and
a suspension system coupled to the rear seat and configured to permit the rear seat to pivot relative to the frame to lessen the effects of rough or uneven terrain.

54. The all-terrain vehicle of claim 53, wherein the suspension system is coupled between the rear seat and the front seat and configured to permit the front seat and the rear seat to pivot relative to each other and to the frame.

* * * * *